United States Patent [19]
Sato et al.

[11] Patent Number: 5,613,400
[45] Date of Patent: Mar. 25, 1997

[54] BALL SCREW DEVICE WITH RESONANCE PREVENTING MEANS FOR A SCREW SHAFT AND TABLE DRIVE DEVICE INCLUDING THE SAME

[75] Inventors: Hideyuki Sato; Toshiharu Kajita, both of Gunma, Japan

[73] Assignee: NSK Ltd., Tokyo, Japan

[21] Appl. No.: 373,379

[22] Filed: Jan. 17, 1995

[30] Foreign Application Priority Data

Jan. 18, 1994 [JP] Japan .................................. 6-003773
Apr. 20, 1994 [JP] Japan .................................. 6-081668

[51] Int. Cl.$^6$ .................................................. F16H 25/24
[52] U.S. Cl. ................................ 74/89.15; 74/424.8 R; 248/676; 188/378; 52/167.3
[58] Field of Search .......................... 74/89.15, 424.8 R, 74/459; 248/562, 676; 188/378; 52/167.3

[56] References Cited

U.S. PATENT DOCUMENTS

| | | | |
|---|---|---|---|
| 4,671,127 | 6/1987 | Yamaguchi | 74/89.15 |
| 5,169,104 | 12/1992 | Kwoh | 248/676 |
| 5,232,073 | 8/1993 | Bronowicki et al. | 188/378 |
| 5,311,790 | 5/1994 | Yanagisawa | 74/89.15 |
| 5,319,990 | 6/1994 | Veale et al. | 74/89.15 |

FOREIGN PATENT DOCUMENTS

| | | |
|---|---|---|
| 1016510 | 9/1957 | Germany . |
| 611009 | 1/1994 | Japan . |
| 825059 | 12/1959 | United Kingdom ...................... 52/167 |

OTHER PUBLICATIONS

Patent Abstracts of Japan, M–1593, Apr. 15, 1994, vol. 18, No. 212, 6–11009(A).

*Primary Examiner*—Vinh T. Luong
*Assistant Examiner*—David Fenstermacher
*Attorney, Agent, or Firm*—Sughrue, Mion, Zinn, Macpeak & Seas

[57] ABSTRACT

A ball screw device includes a screw shaft including a hollow hole, a vibration controlling mass member inserted into the hollow hole, a rubber member or a synthetic resin member which is interposed between the outer surface of the vibration controlling mass member and the inner surface of the hollow hole of the screw shaft to prevent contact between the vibration controlling mass member and hollow hole. Further, the ball screw device includes vibration controlling mass member hold rings respectively interposed between the outer surface of the vibration controlling mass member and the inner surface of the hollow hole of the screw shaft and providing two or more support points spaced from each other in the axial direction of the mass member, with slight clearances being provided at least between the outside diameter surfaces of the hold rings and the inside diameter surface of the hollow hole. A table drive device, which includes the ball screw device, is supported on a base member in parallel to the screw shaft and can be moved when a ball nut is rotationally driven by a drive motor disposed on the table.

31 Claims, 18 Drawing Sheets

BALL SCREW DEVICE WITH RESONANCE PREVENTING MEANS FOR A SCREW SHAFT AND TABLE DRIVE DEVICE INCLUDING THE SAME

BACKGROUND OF THE INVENTION

The present invention relates to an improved ball screw device for use in a semiconductor chip mounter, a transfer device in a wood working machine and the like, which require a long stroke operation and high Speed operation, and also to an improved table drive device including the ball screw device.

As a feeding device for a table or the like, which is required the above-mentioned long stroke and high speed operations, it is conceived that a hydraulic cylinder device can be used. However, since the hydraulic cylinder device requires a hydraulic unit, the structure cannot be made compact, and the feeding accuracy thereof is not good.

In view of the above problems found in the hydraulic cylinder device, generally, a ball screw device is used. The ball screw device is advantageous in that it is compact, provides a good feeding accuracy and does not generate a lot of friction or heat. And, in such use, for a high speed operation, especially a ball screw having a large lead is used and, by rotating the screw shaft thereof, a moving table with a nut fixed thereto is moved at a high speed.

However, in the ball screw device, the support span of the screw shaft thereof varies with the movement of the ball nut thereof. That is, the natural frequency of the screw shaft varies according to the positions of the ball nut with respect to the screw shaft and the critical speed of the screw shaft, at which rotation becomes unstable, varies according to the variations of the natural frequency of the screw shaft. In the case of a long stroke, since the support span of the screw shaft is long, the critical speed of the screw shaft is in a low rotation area and, thus, when the screw shaft is rotated at a high speed, the rotation speed of the screw shaft goes beyond the critical speed of the screw shaft. When the screw shaft is rotated in the neighborhood of the critical speed thereof, the screw shaft resonates to produce great vibrations so that the operation of the screw shaft becomes unstable and possibly dangerous. If such a vibrating condition of the screw shaft continues, then the ball screw device may be damaged.

In order to avoid such vibration of the screw shaft, there is proposed a table drive device in which a screw shaft is fixed and a ball nut is rotated to thereby move a moving table.

However, even in a ball screw device of a type that a ball nut is rotated, since the support span of a screw shaft remains long, the natural frequency of the screw shaft itself remains low. Therefore, when the frequencies of minute vibrations to be applied to the screw shaft by the rotation of the ball nut are in the critical speed area thereof, although there vibratory rotations due to eccentric mass are not generated as in the screw shaft rotation type, a resonant phenomenon occurs so that large vibrations are produced.

Thus, even if the vibration of the ball nut to be given to the screw shaft is small, the vibration due to resonant phenomenon causes the screw shaft to be vibrated greatly. In view of this, a table drive device using a ball screw device is generally used at rotational speeds lower than the critical speed of the screw shaft. And, even if a large lead ball screw device is used, the speed of the table drive device is naturally restricted and thus the feeding speed thereof is restricted.

And, in order to realize a high speed, if the screw lead of the large lead ball screw device is made too large, then the drive force of a motor must be made large and thus the inertia of the moving table is increased, which makes it difficult to secure the stop position accuracy of the table.

In view of the above, Japanese Patent Unexamined Publication No. Hei 6-11009 proposes a ball screw device in which a long inner shaft is held as a vibration controlling mass member within a screw shaft including a hollow hole in a coaxial manner, the inner shaft is arranged such that it collides with the inner surface if the hollow hole when the screw shaft vibrates, and such collision restricts the vibration of the screw shaft at the resonating point thereof, thereby being able to realize the operation of the screw shaft at a speed exceeding the critical speed thereof. In this publication, there is disclosed an embodiment in which, when the screw shaft and inner shaft contact each other due to the working precision of the hollow hole of the screw shaft, flexure of the inner shaft, or the like one point of the inner shaft around the central portion thereof is fixed by an annular bush.

However, in the ball screw device proposed in the above-mentioned Japanese Unexamined Patent Publication No. Hei 6-11009, although the long vibration controlling mass member held coaxially by the screw shaft is so arranged as to collide with the inside surface of the hollow screw shaft while it is vibrating, it cannot be always expected that the screw shaft and vibration controlling mass member move relative to each other when the screw shaft is excited at a low frequency. Thus, to control the vibration of the screw shaft at a low frequency, the screw shaft and vibration controlling mass member must be made such that they can carry out their relative movements efficiently. However, in Japanese Patent Unexamined Publication No. Hei 6-11009, no concrete means for realizing the above-mentioned relative movements is taken into consideration and thus it cannot be said that a sufficient damping effect can be expected.

SUMMARY OF THE INVENTION

Therefore, the present invention has been made to eliminate the above-mentioned problems found in the conventional ball screw device and table drive device. Accordingly, it is an object of the present invention to provide a ball screw device which dampens greatly the vibration of a ball nut to be transmitted to a screw shaft to thereby prevent the resonance of the screw shaft and allows a long stroke and high speed operation, and also to provide a table drive device including the ball screw device.

Further, it is another object of the present invention to provide a ball screw device Which includes a long screw shaft and can always provide an excellent damping effect in a wide frequency area including a low frequency area.

Also, it is still another object of the present invention to provide a ball screw device which can restrict vibrations in a wide range of frequencies in correspondence to the natural frequency of a screw shaft which varies according to the position of a ball nut.

In attaining the above objects, according to a first aspect of the present invention, there is provided a ball screw device which comprises: a long screw shaft including a ball screw groove on the outer peripheral surface thereof and a hollow hole; a ball nut including ion the inner surface thereof a ball screw groove opposed to the ball screw groove formed in the screw shaft; a large number of balls fitted between the ball screw groove of the screw shift and the ball screw groove of the ball nut to allow the screw shaft and ball nut to move spirally relative to each other; a long vibration controlling mass member inserted into the hollow hole of the screw shaft; and a rubber member or a synthetic resin member interposed between the outer surface of the vibration controlling mass member and the inner surface of the hollow hole of the screw shaft to prevent contact between the vibration controlling mass member and hollow hole.

Also, there is provided a table drive device which comprises: a long screw shaft having two end portions fixed to a base member, including a ball screw groove on the outer peripheral surface thereof, and including a hollow hole; a table supported on the base member in such a manner that it is free to move in parallel to the axial direction of the screw shaft; a ball nut including on the inner peripheral surface a ball screw groove opposed to the ball screw groove formed in the screw shaft and supported rotatably on the table; a large number of balls fitted between the ball screw groove of the screw shaft and the ball screw groove of the ball nut to enable the screw shaft and ball nut to move spirally with respect to each other; drive means mounted on the table to rotate the ball nut; a long vibration controlling mass member inserted into the hollow hole of the screw shaft; and a rubber or synthetic resin member interposed between the outer surface of the vibration controlling mass member and the inner surface of the hollow hole of the screw shaft to prevent contact between the vibration controlling mass member and hollow hole.

According to a second aspect of the present invention, there is provided a ball screw device which comprises a long screw shaft including a ball screw groove on the outer peripheral surface thereof and a hollow hole formed therein, a ball nut including on the inner peripheral surface thereof a ball screw groove opposed to the ball screw groove of the screw shaft, a large number of balls fitted between the ball screw groove of the screw shaft and the ball screw groove of the ball nut for enabling the screw shaft and ball nut to move spirally with respect to each other, and a vibration controlling mass member inserted into the hollow hole of the screw shaft with a clearance in the diameter direction thereof, in which the ball screw device further includes vibration controlling mass member hold rings respectively interposed between the outer surface of the vibration controlling mass member and the inner surface of the hollow hole of the screw shaft and providing two or more support points spaced from each other in the axial direction of the mass member, and there are provided slight clearances at least between the outside surfaces of the hold rings and the inside surface of the hollow hole of the screw shaft.

Further, the present ball crew device is characterized in that the intervals of the two or more support points in the axial direction of the vibration controlling mass member to be provided by the vibration controlling mass member hold rings are made to differ from one another so that the vibration controlling mass member can have a plurality of natural frequencies.

According to the first aspect of the present invention, the screw shaft of the ball screw device is hollow, the long vibration controlling mass member is inserted into the hollow hole of the screw shaft, and the rubber or synthetic resin member is interposed between the outer surface of the vibration controlling member and the inner surface of the hollow hole of the screw shaft to prevent direct contact between them, thereby being able to increase a damping effect with respect to the vibration of the screw shaft in the diametrical direction thereof. The rubber or synthetic resin member serving as a damping member has a spring constant which is not linear like a metal spring and also has a high capacity for absorbing vibratory energy due to the internal friction thereof, so that the composite vibration of the screw shaft and vibration controlling mass member can be damped rapidly.

Also, since the respective natural frequencies of the screw shaft and vibration controlling mass member are different from each other, friction produced between them can also enhance a damping effect indirectly.

In the ball screw device according to the second aspect of the present invention, by changing the axial intervals between the hold rings holding the vibration controlling mass member, the natural frequency of the vibration controlling mass member in the radial direction thereof is so changed as to approach the natural frequency of the screw shaft and, therefore, even if an exciting force (an exciting acceleration) becomes small, the resonant condition of the vibration controlling mass member can be generated. If the resonant condition is generated, then the vibration controlling mass member starts to vibrate independently, with the result that a great relative movement is generated between the vibration controlling mass member and the screw shaft. Even when the spring stiffness of the vibration controlling mass member is not great, since there exists a slight clearance between the screw shaft and vibration controlling mass member, there are produced shocks and frictional forces between the screw shaft and vibration controlling mass member due to their relative movements.

In this manner, even when a frequency is low and an exciting force from the screw shaft is small, there is produced a great vibration controlling effect so that the vibration of the screw shaft can be restricted.

However, the above-mentioned vibration controlling effect can be realized only in a certain frequency range. In view of the fact that the natural frequency of the screw shaft always varies according to the position of the ball nut, according to the invention, by inserting a plurality of vibration controlling mass member hold rings having different support spans into the hollow hole of the screw shaft, the vibration controlling effects of the respective hold rings are combined together to expand the frequency area in which the vibration controlling effects cab be realized, so that the vibration of the screw shaft can be controlled in a wide range of frequencies.

DETAILED DESCRIPTION OF THE PREFERRED EMBODIMENTS

Now, preferred embodiments of the present invention will be described with reference to the accompanying drawings.

Figure 1:
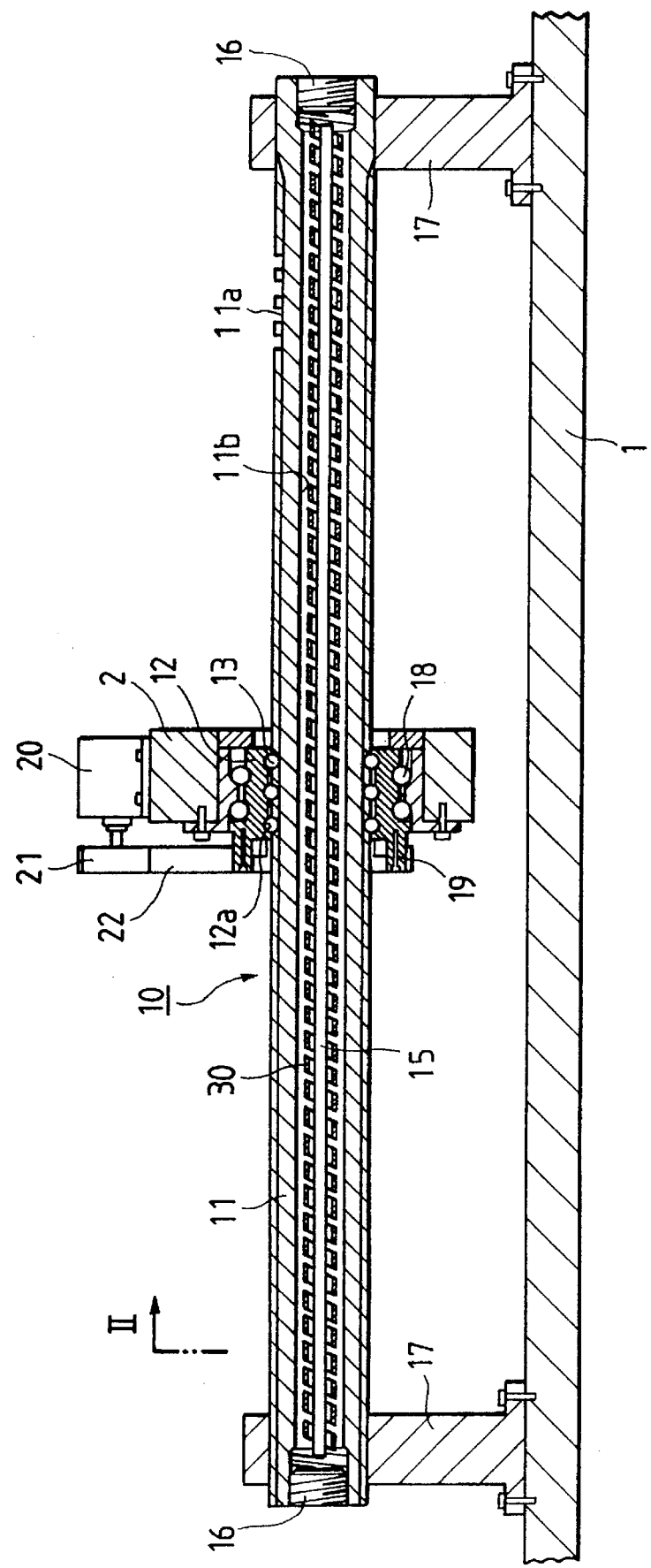
FIG. 1 is a longitudinal section view of a first embodiment of a ball screw device according to the invention.
Figure 2:
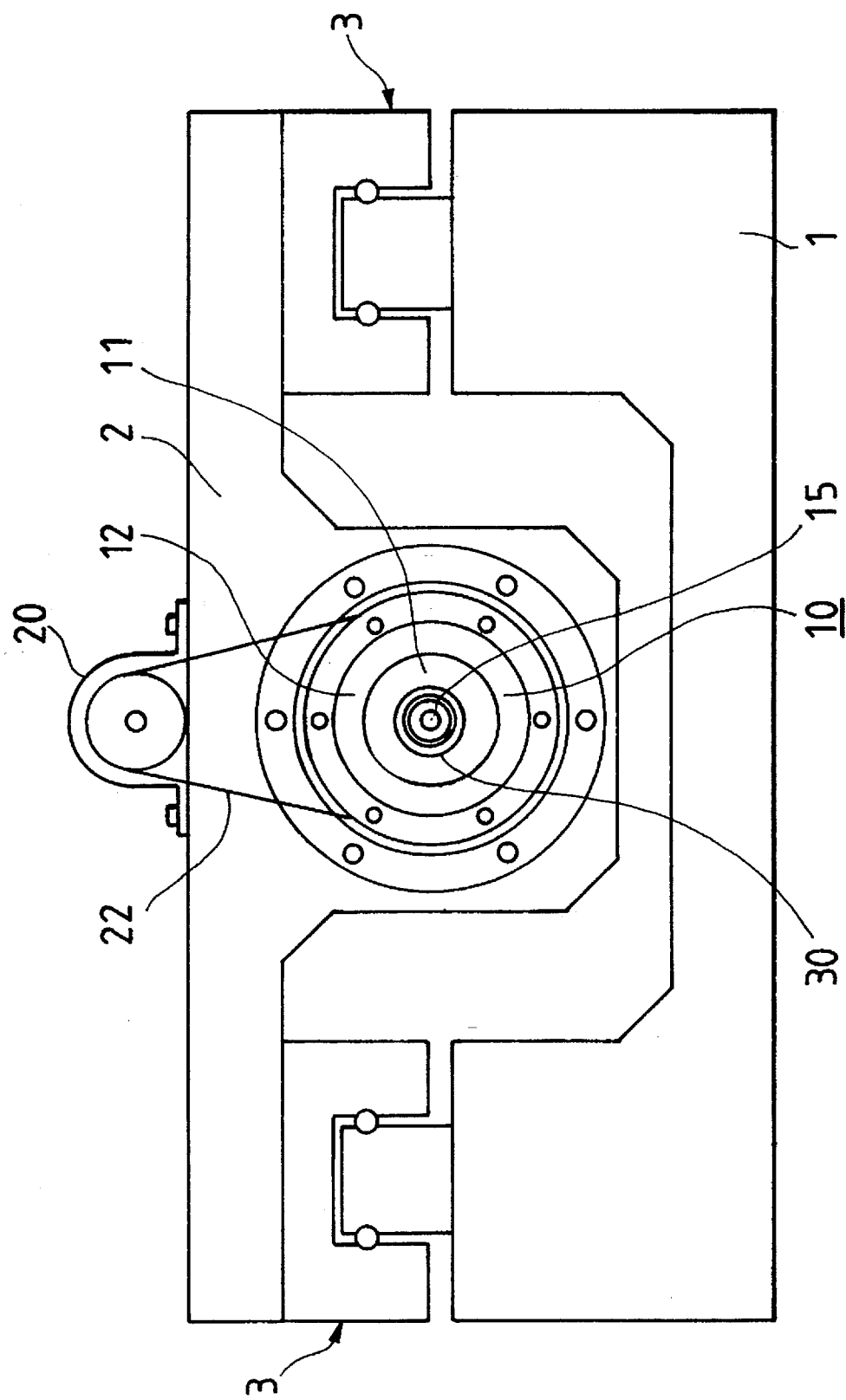
FIG. 2 is a side view of the first embodiment taken along the arrow II shown in FIG. 1.

FIG. 1 is a longitudinal section view of a table drive device using a ball screw device according to a first embodiment of the present invention, and FIG. 2 is a side view taken along the arrow II in FIG. 1.

The structure thereof will be described at first. The table drive device shown in the drawing is used to drive and feed a table 2, which is supported such that it can be moved axially along a long base member 1, by means of a ball screw device 10.

The table 2 is mounted on the base member 1 having a substantially U-shaped section in such a manner that it can be moved smoothly through a linear guide bearing (linear guide device) 3.

The ball screw device 10 comprises a long hollow screw shaft 11 including a spirally shaped ball screw groove 11a on the outer peripheral surface thereof, a ball nut 12 including on the inner peripheral surface thereof a ball screw groove 12a which is so disposed as to be opposed to the ball screw groove 11a formed in the screw shaft 11, and a large number of balls 13 which are respectively fitted between the two ball screw grooves 11a and 12a and also which enable the screw shaft 11 and ball nut 12 to move spirally with respect to each other.

In the present embodiment, although not shown, there is employed an endless cap system in which, for example, endless caps each having a substantially doughnut-shaped curved passage used to guide and circulate the moving balls 13 through a through hole formed in the body portion of the ball nut 12 are respectively mounted on the two ends of the nut body portion, and the balls 13, which have moved from the ball screw groove 11a of the screw shaft and made a U-turn in one of the curved passages and further advanced through the through hole, make an inversed U-turn in the other curved passage and returns between the ball screw groove 11a and the ball screw groove 12a of the ball nut, the balls 13 being adapted to repeat the above operations.

In the hollow hole 11b of the screw shaft 11, there is inserted a vibration controlling mass member 15 which is composed of, for example, a long iron rod. In the present embodiment, the screw shaft 11 has an outside diameter of 20 mm, an inside diameter of 12 mm, a length of 2 m, and a lead of 40 mm, while an iron rod having a diameter of 8 mm and a length of 1.95 m is used as the vibration controlling mass member 15.

A synthetic resin member 30 formed of a spirally shaped resin tape having a thickness of 1 mm is wound around the whole outer surface of the vibration controlling mass member 15. Two cover members 16 are respectively mounted to the two end portions of the hollow hole 11b of the screw shaft 11 to thereby prevent the vibration controlling mass member 15 and synthetic resin member 30 from slipping off.

The screw shaft 11 of the ball screw device 10 having the above-mentioned structure is disposed on the base member 1 just above a recessed portion formed in the central portion of the base member 1, and the two end portions of the screw shaft 11 are unrotatably fixed and supported to the base member 1 through screw shaft fixing member 17, respectively.

On the other hand, the ball nut 12 threadedly engaged with the screw shaft 11 is rotatably fitted through a ball bearing 18 to the lower portion of the table 2 which travels along the base member 1. A pulley 19 is mounted on the end face of the ball nut 12 in an integrally rotatable manner. A driving motor 20 is disposed on the upper surface of the table 2. A pulley 21 mounted on the output shaft of the motor and the above pulley 19, are connected with each other by means of a timing belt 22 in such a manner that they can be rotated synchronously.

Next, the operation of the present embodiment will be described.

If the driving motor 20 is rotationally driven, then the driving torque of the motor 20 is transmitted to the pulley 21, timing belt 22 and pulley 19 to thereby rotate the ball nut 12 of the ball screw device 10. Due to this, the balls 13 fitted between the screw shaft 11 and the ball nut 12 roll and move between the ball screw grooves 11a and 12a of the screw shaft 11 and the ball nut 12, and the balls 13 repeat an endless circulation within the ball nut 12 via a circulation passage (not shown). As a result, the ball nut 12 is guided by the unrotatably fixed and supported screw shaft 11 and is moved axially. At the same time, while being guided by the linear guide device 3, the table 2 is axially moved smoothly over the base member 1.

In this case, since the screw shaft 11 is not rotated, vibratory rotation due to and eccentric mass therein is not generated as in a case where the shaft is rotated. However, because there is applied a slight vibration due to the rotation of the ball nut 12 to the screw shaft, vibration is provided. Thus, since the long screw shaft 11 has a long support span and a low natural frequency, if the ball nut 12 is rotated at a high speed, then the frequency of the above-mentioned slight vibration can be in the critical speed area of the screw shaft 11. In this instance, if the screw shaft is an ordinary solid shaft, then a resonant phenomenon can occur, thereby causing the screw shaft 11 to vibrate greatly.

According to the present embodiment, however, the screw shaft 11 is hollow, the long vibration controlling mass member 15 is inserted into the hollow portion of the screw shaft 11, and the synthetic resin member 30 serving as a damping member is interposed between the outer surface of the vibration controlling mass member 15 and the inside diameter surface of the screw shaft. That is, the synthetic resin member 30 prevents direct contact between the screw shaft 11 and vibration controlling mass member 15 to thereby enhance a damping effect with respect to the vibration of the screw shaft 11 in the diametrical direction thereof. Further, since the spring constant of the synthetic resin member 30 is not linear and the synthetic resin member 30 has a high capacity for absorbing vibration energy due to the internal friction thereof, the vibration of the screw shaft 11 can be dampened rapidly. Also, because the screw shaft 11 and vibration controlling mass member 15 respectively have different natural frequencies, the screw shaft 11 and vibration controlling mass member 15 are vibrated non-synchronously when the ball nut 12 is rotated. As a result of this, there is produced friction between the two members 11, 15 and the synthetic resin member 30 and thus the vibration energy of the screw shaft 11 is consumed also as the friction heat thereof, so that the vibration of the screw shaft 11 is dampened. For reference, when the inventors conducted an experiment with the cover members 16 removed from the screw shaft 11, it was observed that the vibration controlling member 15 was rotated in the opposite direction to the rotation of the ball nut 12 and rubbed against the synthetic resin member 30.

Thus, the resonant vibration of the screw shaft 11 is restricted by the above vibration damping action, with the result that great vibration of the screw shaft 11 can be prevented even during high speed rotation of the ball nut 12.

The results of test to confirm the above-mentioned vibration controlling effect will be described with reference to FIGS. 7 to 9.

(1) Test Method

By use of the device shown in FIG. 1, the vibration of the screw shaft 11 occurring when the traveling and stopping of the table 2 by means of the rotation of the ball nut 12 were repeated, was recorded.

Three kinds of screw shafts were used, that is, (a) a solid screw shaft, (b) a hollow screw shaft with only the vibration controlling mass member 15 itself inserted into the hollow portion thereof, and (c) a hollow screw shaft including in the hollow portion thereof the vibration controlling mass member 15, the entire length of which is wound by the synthetic resin member 30 formed of a spirally shaped resin tape.

(2) Test Data

Each of the three screw shafts had an outside diameter of 20 mm, an inside diameter of 12 mm (when hollow), a length of 2 m, and a screw lead 40 mm.

The rotation speed of the ball nut was 3,000 rpm.

The vibration controlling mass member was formed of an iron rod which has a diameter of 8 mm and a length of 195 cm.

The synthetic resin member was formed of a spirally shaped resin tape having a thickness of 1 mm.

(3) Test Results

Figure 7:
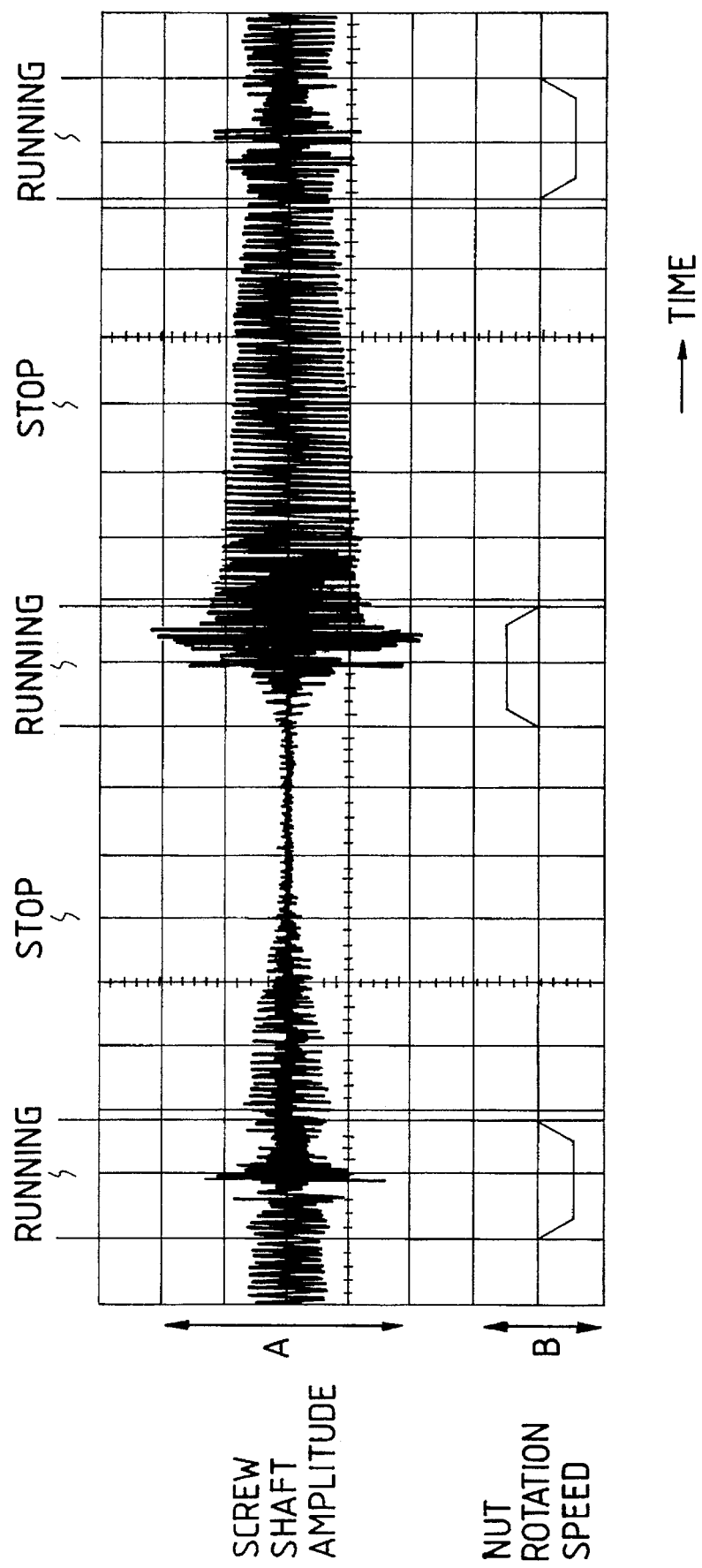
FIG. 7 is a graphical representation of the vibration characteristic of a solid screw shaft.

The vibrating state of the screw shaft (a) is shown in a graph in FIG. 7.

Figure 8:
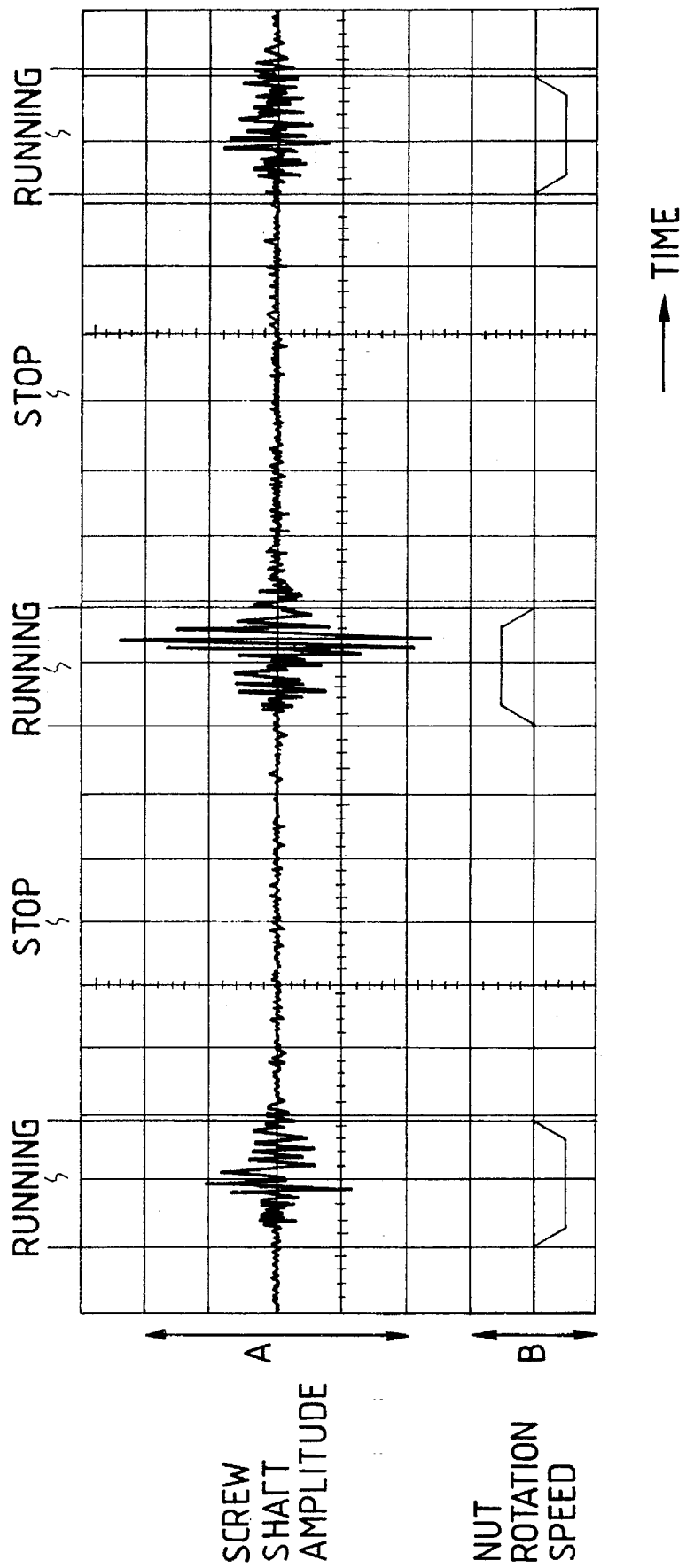
FIG. 8 is a graphical representation of a vibration characterisitic obtained when only the vibration controlling mass member is mounted into the screw shaft.

The vibrating state of the screw shaft (b) is shown in a graph in FIG. 8.

Figure 9:
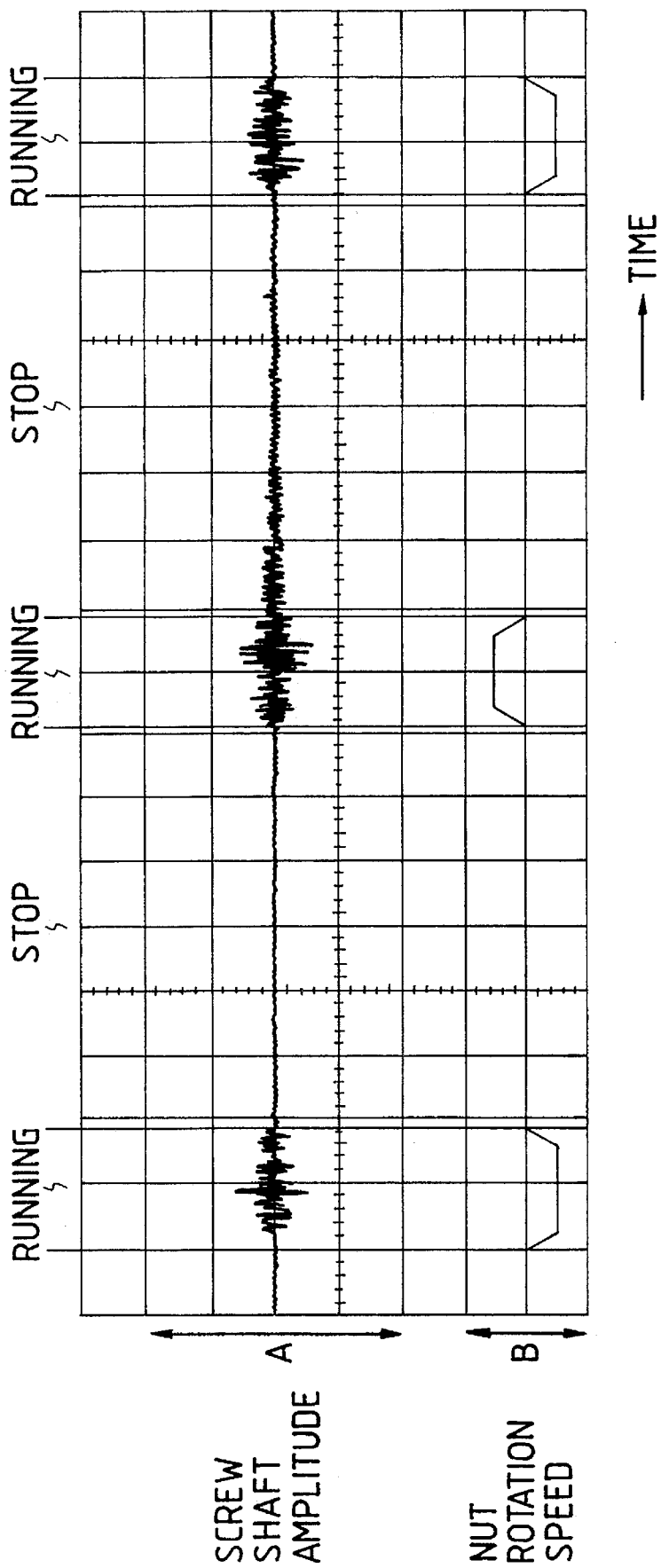
FIG. 9 is a graphical representation of the vibration characteristic of a screw shaft according to the first embodiment.

The vibrating state of the screw shaft (c) is shown in a graph in FIG. 9.

In the respective graphs, the abscissa thereof represents time (a graduation represents 500 msec.), while A of the ordinate thereof expresses the amplitude of the vibration of the screw shafts (a graduation expresses 20 μm).

Also, B of the ordinate points out the time change of the rotation speed of the ball nut, and B is inverted up and down according to the reciprocating movements of the ball nut.

As can be seen clearly when these graphs are compared with one another, the screw shaft (c) according to the present embodiment has a vibration amplitude which is far smaller than the other screw shafts the vibration damping time of the screw shaft (c) is outstandingly shorter than the other screw shafts.

In this manner, according to the present embodiment, the vibration of the screw shaft 11 while the ball screw is in operation can be reduced to a great extent by employing the above-mentioned structure in which there is the hollow hole 11b in the screw shaft 11 of the ball screw device 10, the long vibration controlling mass member 15 is inserted through the hollow hole 11b, and the synthetic resin member 30 formed of a spirally shaped resin tape is wound around the outer surface of the vibration controlling mass member 15 to thereby prevent direct contact between the inner surface of the hollow hole and the vibration controlling mass member 15. As a result of this, the ball screw device 10 can be operated at a higher rotation speed, that is, the rotation speed of the ball screw device 10, which is generally controlled down to or lower than 80% of the critical speed, can be increased up to or higher than the critical speed.

Also, according to the present embodiment, since the tape-shaped synthetic resin member 30 is spirally wound around and mounted to the vibration controlling mass member 15, even the long vibration controlling mass member 15 can be mounted easily.

Further, even if the diameter of the vibration controlling mass member is changed, it can be used conveniently.

Although the spirally-arranged resin tape is used in the present embodiment, a spirally-arranged rubber tape may also be used.

Figure 3:
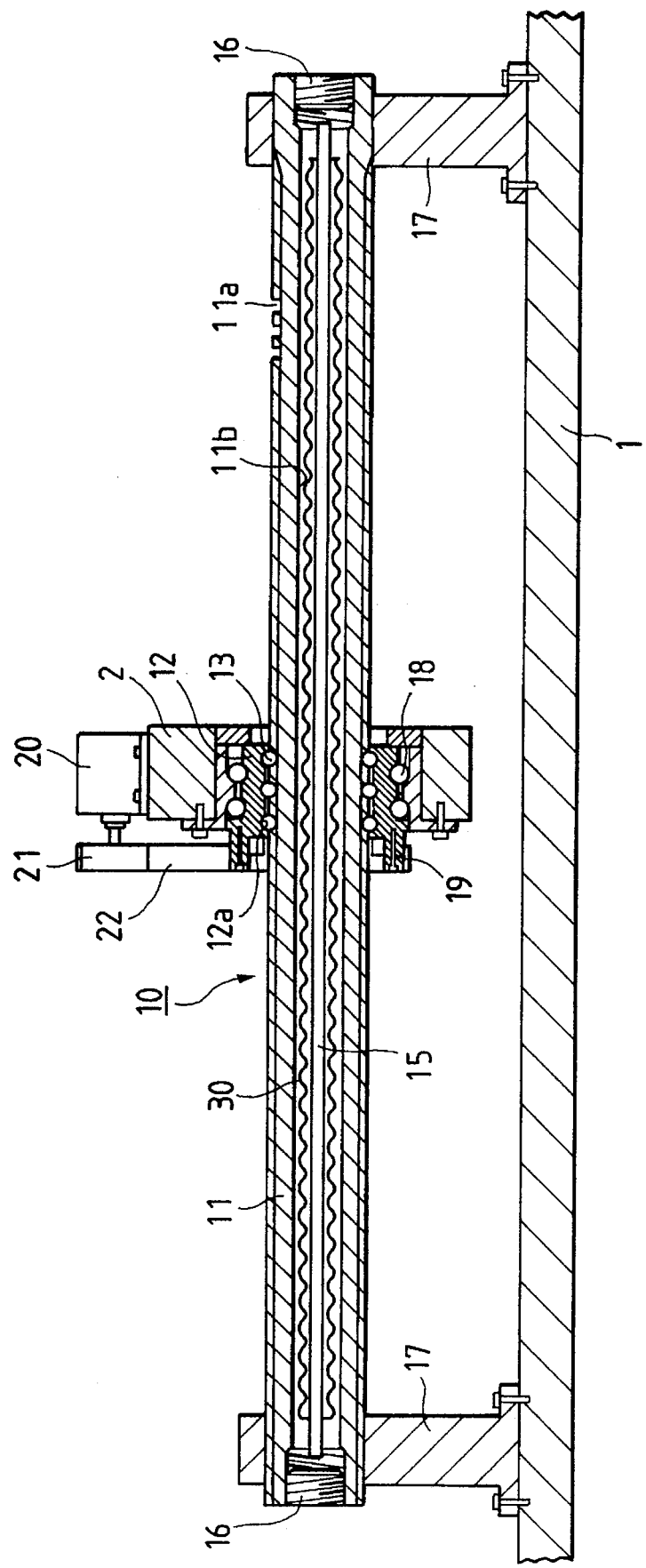
FIG. 3 is a longitudinal section view of a second embodiment of a ball screw device according to the invention.

FIG. 3 shows a second embodiment of a ball screw device according to the present invention.

The second embodiment is different from the above-mentioned first embodiment in that it uses a resin tube as the synthetic resin member 30 mounted inside the screw shaft 11 of the ball screw device 10. A conventional resin tube available on the market can be simply put on the vibration controlling mass member 15. However, if the mass member 15 is too long in length, it can be difficult to cover the mass member 15 with the resin tube. The second embodiment is similar in structure to the first embodiment except for the structure of the synthetic resin member 30.

Figure 4:
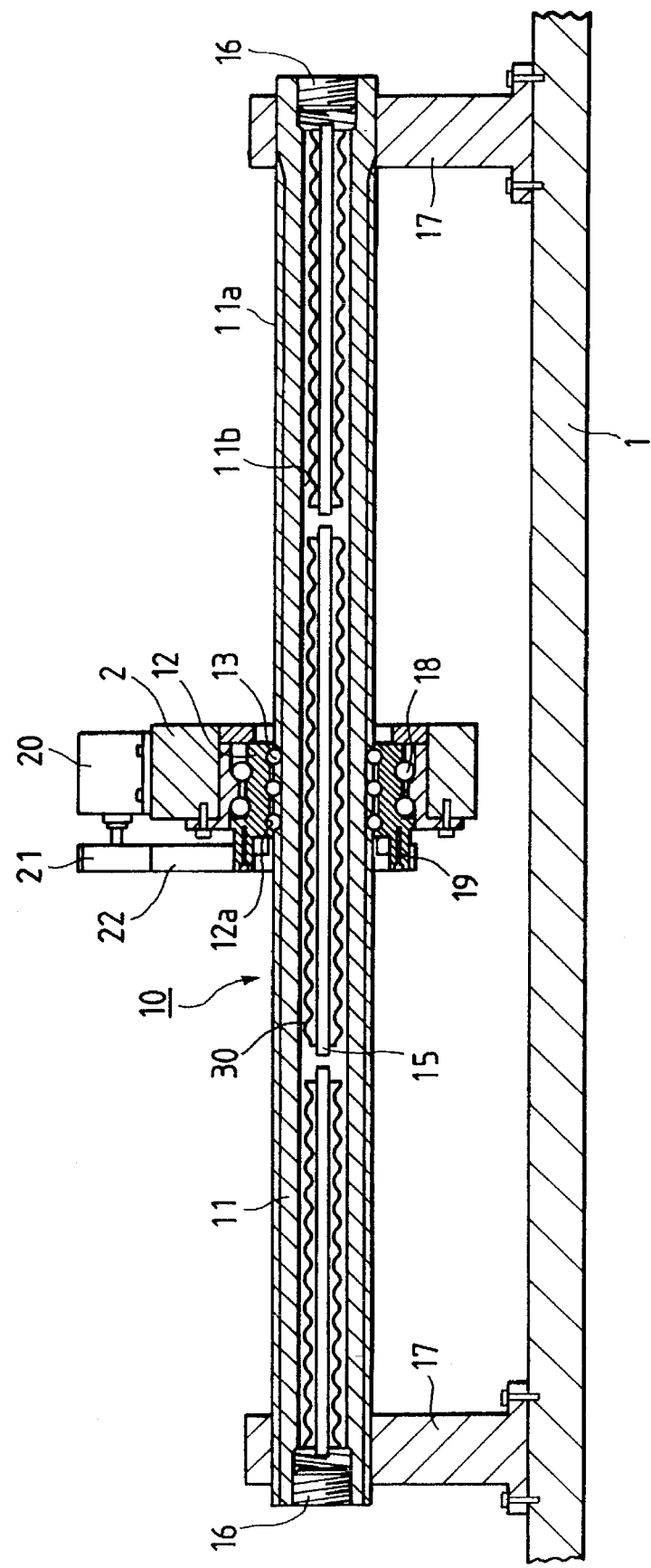
FIG. 4 is a longitudinal section view of a third embodiment of a ball screw device according to the invention.

FIG. 4 shows a third embodiment of a ball screw device according to the present invention, which is an improved version of the second embodiment in FIG. 3.

In the third embodiment, the long vibration controlling mass member 15 used in the second embodiment shown in FIG. 3 is divided into a plurality of (in FIG. 4, three) sections and the respective sections are covered with synthetic resin members 30 formed of resin tubes respectively corresponding in length to their associated mass member sections. This structure facilitates the mounting of the synthetic resin members 30 and makes it easy to insert the vibration controlling mass members 15 covered with the synthetic resin members 30 into the screw shaft 11.

Although the resin tube is used in the second and third embodiments, a rubber tube can be used instead of the resin tube.

Figure 5:
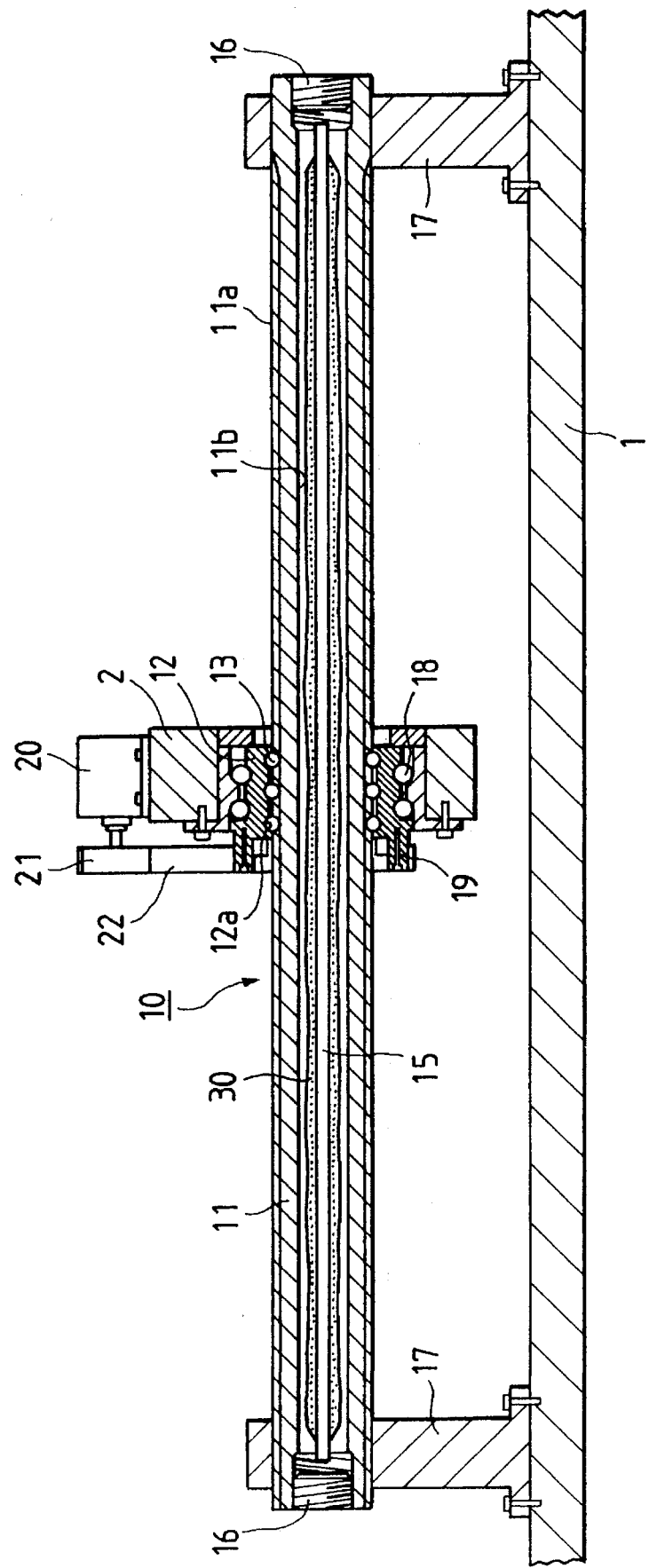
FIG. 5 is a longitudinal section view of a fourth embodiment of a ball screw devices according to the invention.

FIG. 5 shows a fourth embodiment of a ball screw device according to the present invention.

In the fourth embodiment, the long vibration controlling mass member 15 to be inserted into the hollow screw shaft 11 is previously coated with resin or rubber as a rubber member or a synthetic resin member 30. The coated rubber member and synthetic resin member 30 provides a vibration damping effect similar to the above-mentioned respective embodiments. Also, because the vibration controlling mass member 15 and the rubber or synthetic resin member 30 are in integral contact with each other and are thus prevented from separating or shifting from each other, it is easy to insert them into the screw shaft 11.

Also, the resin or rubber may be coated on the inner peripheral surface of the hollow screw shaft 11 instead of the outer peripheral surface of the vibration controlling mass member 15, or the resin or rubber may be coated on both of the outer peripheral surface of the vibration controlling mass member 15 and the inner peripheral surface of the screw shaft 11.

Figure 6:
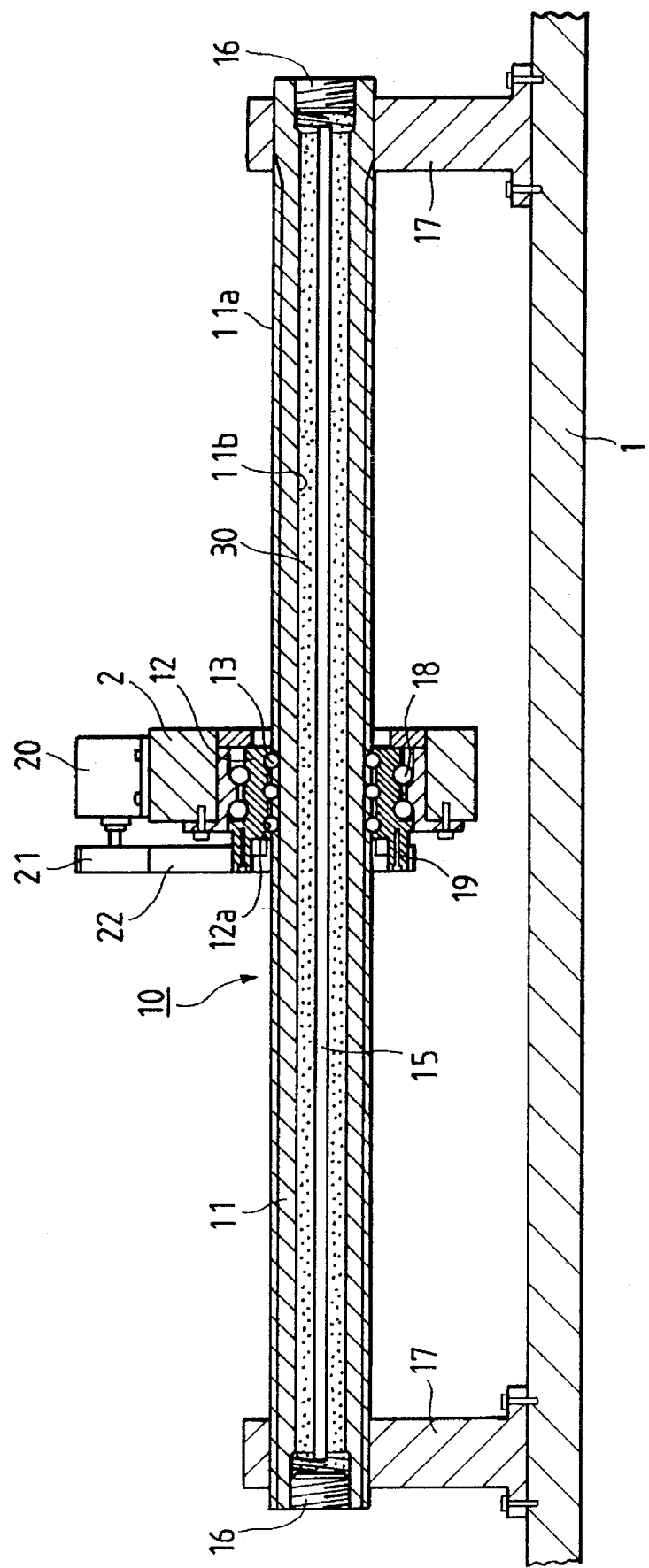
FIG. 6 is a longitudinal section view of a fifth embodiment of a ball screw device according to the invention.

FIG. 6 shows a fifth embodiment of a ball screw device according to the present invention.

In the fifth embodiment, the long vibration controlling mass member 15 is molded with resin in the hollow hole 11b of the screw shaft 11. Since the molded resin shrinks a little when it is solidified, there is produced a slight clearance between the outer peripheral surface of the synthetic resin material 30 and the inner peripheral surface of the hollow hole 11b. This enables the vibration controlling mass member 15 to vibrate separately from the screw shaft 11, so that an effective vibration controlling operation can be performed. The molded resin, similarly to the above-mentioned respective embodiments, relieves a collision between the screw shaft 11 and the vibration controlling mass member 15 as well as dampens the vibration of the screw shaft 11.

In the present embodiment, the molding is performed by use of the resin but, alternatively, the molding may be carried out by use of rubber.

Figure 10:
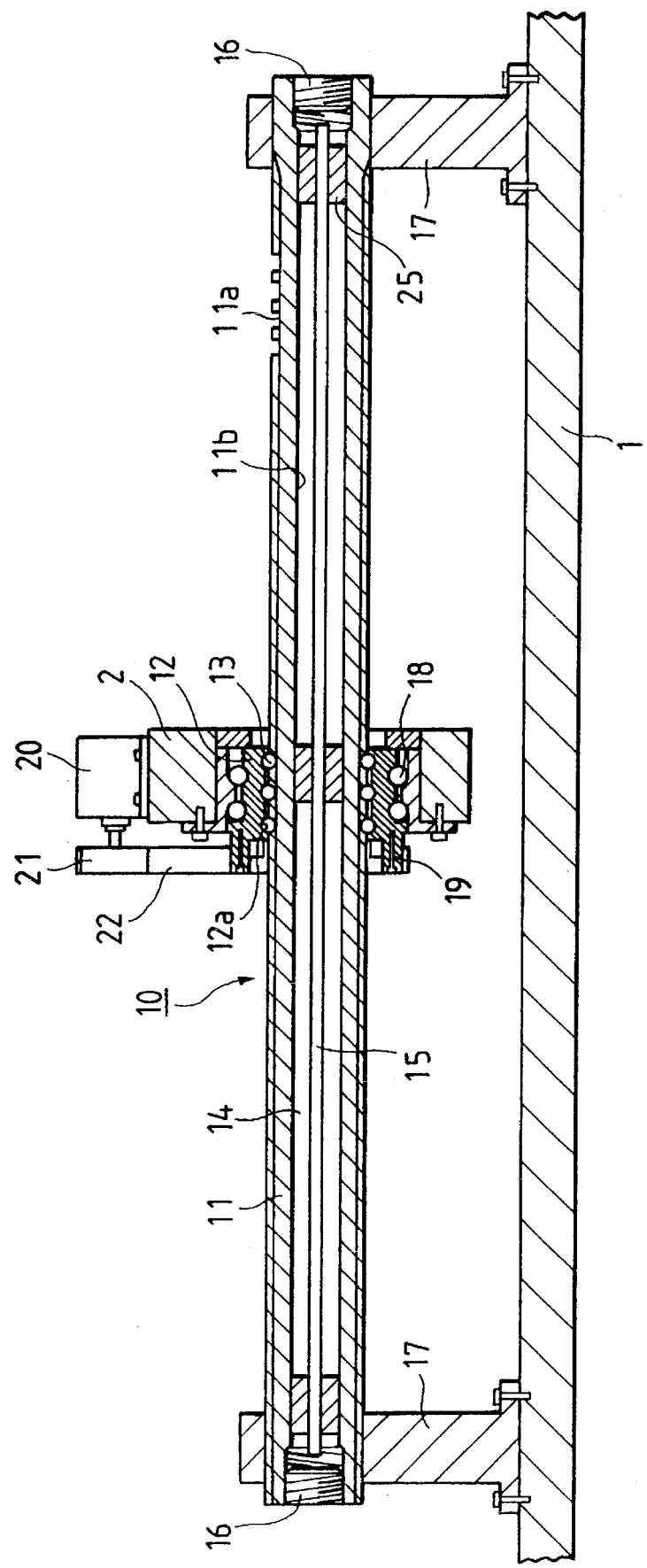
FIG. 10 is a longitudinal section view of a sixth embodiment of a ball screw device according to the invention.

FIG. 10 is a longitudinal section view showing a table drive device to which a ball screw device according to a sixth embodiment of the present invention is applied.

Figure 11:
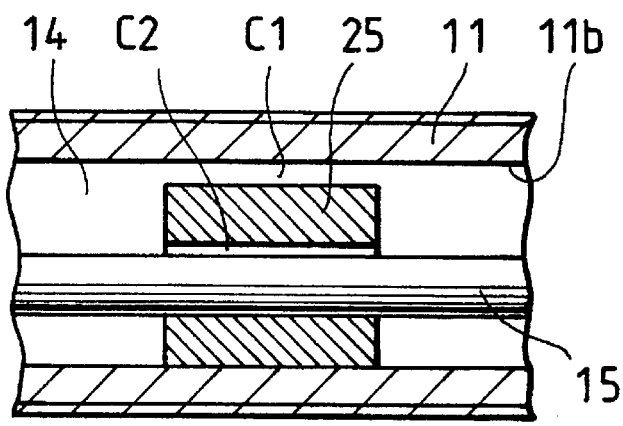
FIG. 11 is an enlarged section view of a structure for holding a vibration controlling mass member shown in FIG. 10.

The basic structure of this table drive device is similar to that shown in the previously described embodiments. However, this sixth embodiment is different from the previously described first to fifth embodiments in the following. That is, a clearance 14 is provided between the inner shaft (vibration controlling mass member) 15 and the inner surface of the hollow hole 11b of the screw shaft 11, and instead of the resin member 30, there are interposed bushings 25 (which are respectively formed of rubber, synthetic resin or the like) serving as vibration controlling mass member hold rings (which will also hereinafter be referred to as hold rings forming three support points at intervals from one another in the axial direction of the inner shaft, so as to hold the inner shaft 15. In the sixth embodiment, as shown in FIG. 11, there is provided a clearance C1 between the outside surface of the bush 25 and the inside surface of the hollow hole 11b, and there is also provided another clearance C2 between the inside surface of the bushing 25 and the outside surface of the inner shaft 15. Due to this, the bushing 25 can be moved within the hollow hole 11b. That is, the axial position of the bushing 25 can be adjusted freely to thereby change the support intervals (support spans) of the inner shaft 15.

These clearances C1 and C2 may be of such a small size that allows the bushing 25 to slide along the inside surface of the hollow hole as well as along the outside surface of the inner shaft.

Cover members 16 are mounted on the openings of the two end portions of the hollow holes 11b of the screw shaft 11 to prevent the inner shaft 15 and bushing 25 from slipping off the hollow hole 11b.

According to the sixth embodiment of the present invention, the screw shaft 11 is made hollow, the long inner shaft 15 is inserted into the hollow hole of the screw shaft 11, and the inner shaft 15 is supported by the three bushings 25 at three points which are axially spaced by distances or support spans from one another. Since the support span can be easily changed by moving the bushings 25 in the axial direction of the inner shaft 15, the natural frequency of the inner shaft 15 can be made to approach the natural frequency of the screw shaft 11. Therefore, even when the screw shaft 11 is excited at a low frequency of, for example, ten and several Hz, if the natural frequency of the inner shaft 15 is near that of the screw shaft 11, then the resonant state of the inner shaft 15 can be generated even if the exciting force (exciting acceleration) due to the rotation of the ball nut 12 is a slight vibration. If such resonance is generated, then the inner shaft 15 starts to vibrate independently of and non-synchronously with the screw shaft 11, with the result that a great relative movement is produced between the inner shaft 15 and screw shaft 11. Since there is provided the slight clearance C1 between the hollow hole of the screw shaft 11 and the outside of the bushing 25 supporting the inner shaft 15, the great relative movement produces shock and frictional forces in the screw shaft 11 and inner shaft 15, so that the vibration energy of the screw shaft 11 can be canceled by the shock and frictional forces and the vibration of the screw shaft 11 can be thereby attenuated.

As described above, according to this embodiment of the present invention, even if the frequency of the screw shaft 11 is low and the exciting force from the screw shaft 11 is small, the support spans provided by the bushings 25 are adjusted to allow the natural frequency of the inner shaft 15 in the radial direction thereof to approach the natural frequency of the screw shaft 11, thereby producing a great vibration controlling effect, so that the vibration of the screw shaft can be restricted.

In FIGS. 12 to 15, there are shown the results of the impulse responses of the screw shaft 11 obtained through a test conducted in order to confirm the above-mentioned vibration controlling effect.

In the test, as a member to be tested, there was used a long hollow screw shaft having a length of 3630 mm, and an outside diameter of 40 mm, and a natural frequency of about 11 Hz, and the damping state of the vibration of the screw shafts obtained when impulses were given to them to thereby vibrate were recorded.

Figure 12:
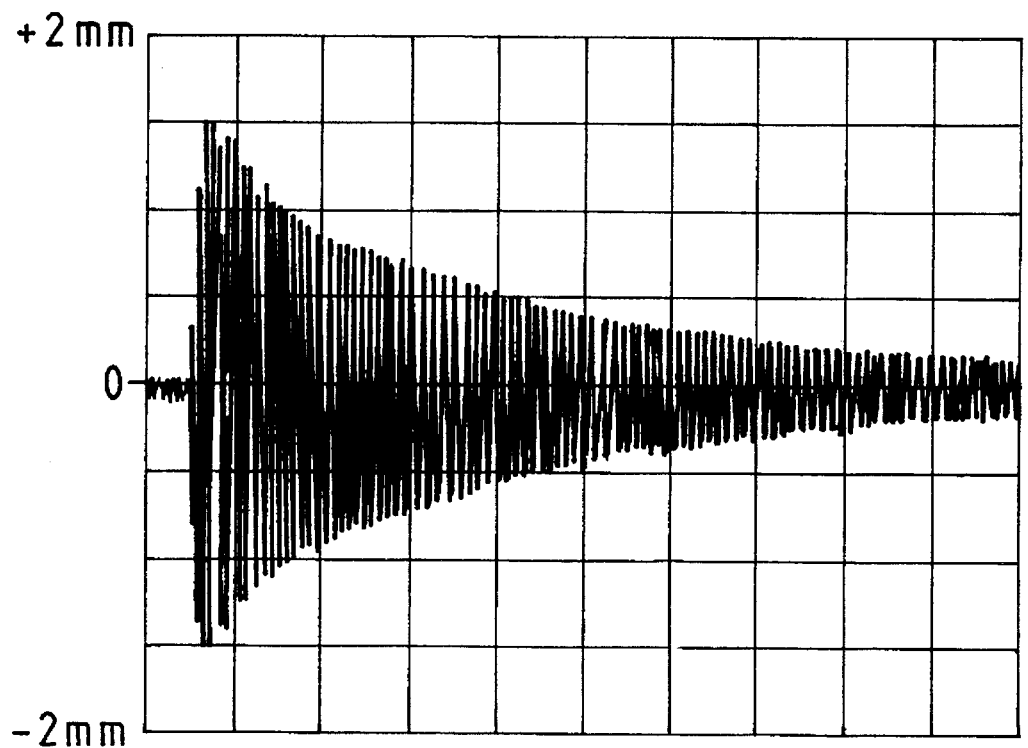
FIG. 12 is a graphical representation of impulse responses obtained when a screw shaft is used singly.

FIG. 12 shows the result of vibration damping state obtained when only the hollow screw shaft was used as the member to be tested.

Figure 13:
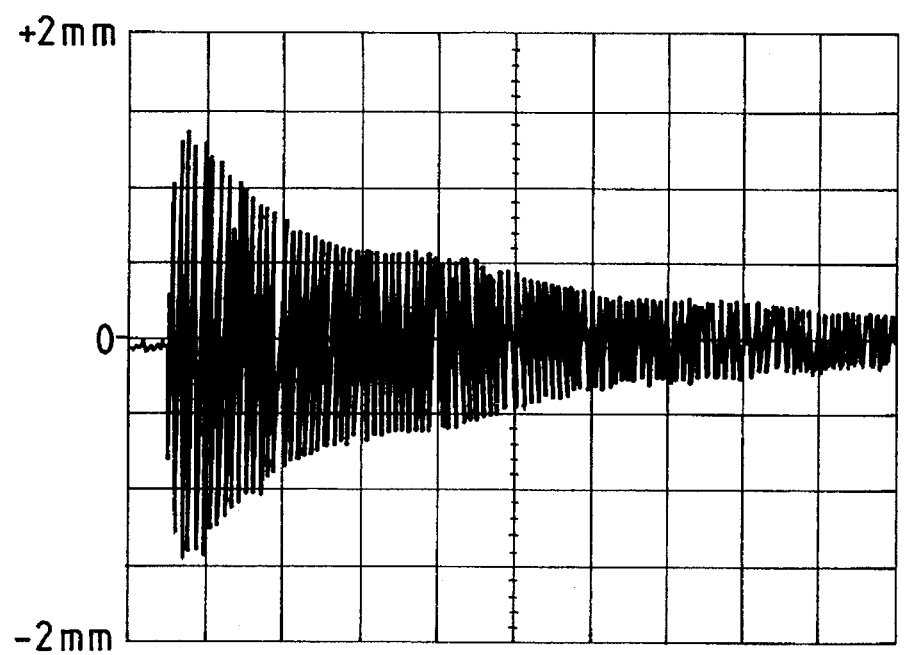
FIG. 13 is a graphical representation of impulse responses obtained when a vibration controlling mass member is inserted into a hollow screw shaft and a rubber member or a synthetic resin member is interposed between the hollow hole of the screw shaft and the vibration controlling mass member.

FIG. 13 shows the result of vibration damping state obtained when the ball screw device of the first embodiment was used as the member to be tested. In this case, a long vibration controlling mass member is inserted into a hollow screw shaft and, between the vibration controlling mass member and the inside surface of the hollow screw shaft, there is interposed a buffer member which is formed of a rubber member or a synthetic resin member having a length extending almost over the whole length of the vibration controlling mass member.

Figure 14:
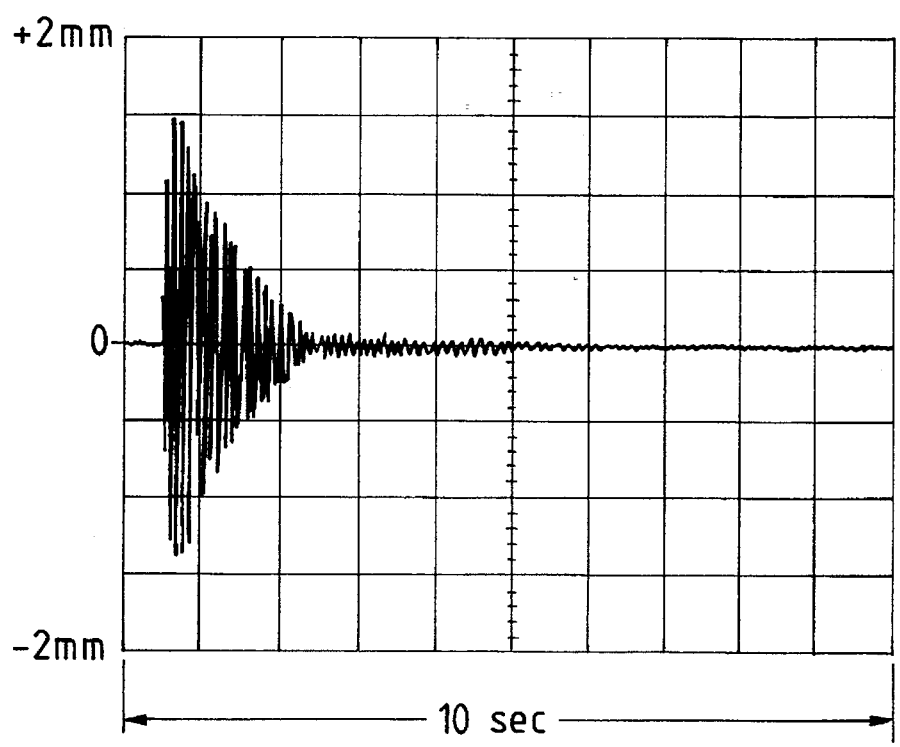
FIG. 14 is a graphical representation of impulse responses obtained when a screw shaft according to the sixth embodiment and shown in FIG. 10 is used.

FIG. 14 shows the result of vibration damping state obtained when the screw shaft 11 employed in the sixth embodiment of the present invention and shown in FIG. 10 was used as the member to be tested.

In the respective graphs shown in FIGS. 12 to 14, the abscissa represents time (a graduation corresponds to 1 sec.), while the ordinate expresses the amplitude of the vibration of the screw shaft (a graduation is equivalent to 0.5 mm).

As can be seen clearly from the comparison among the graphs, when the natural frequency of the screw shaft is as low as in this test, no vibration controlling effect was confirmed in the screw shafts other than the screw shaft of this embodiment, whereas an outstanding vibration damping effect was confirmed in the screw shaft 11 employed in this embodiment shown in FIG. 10.

Figure 15:
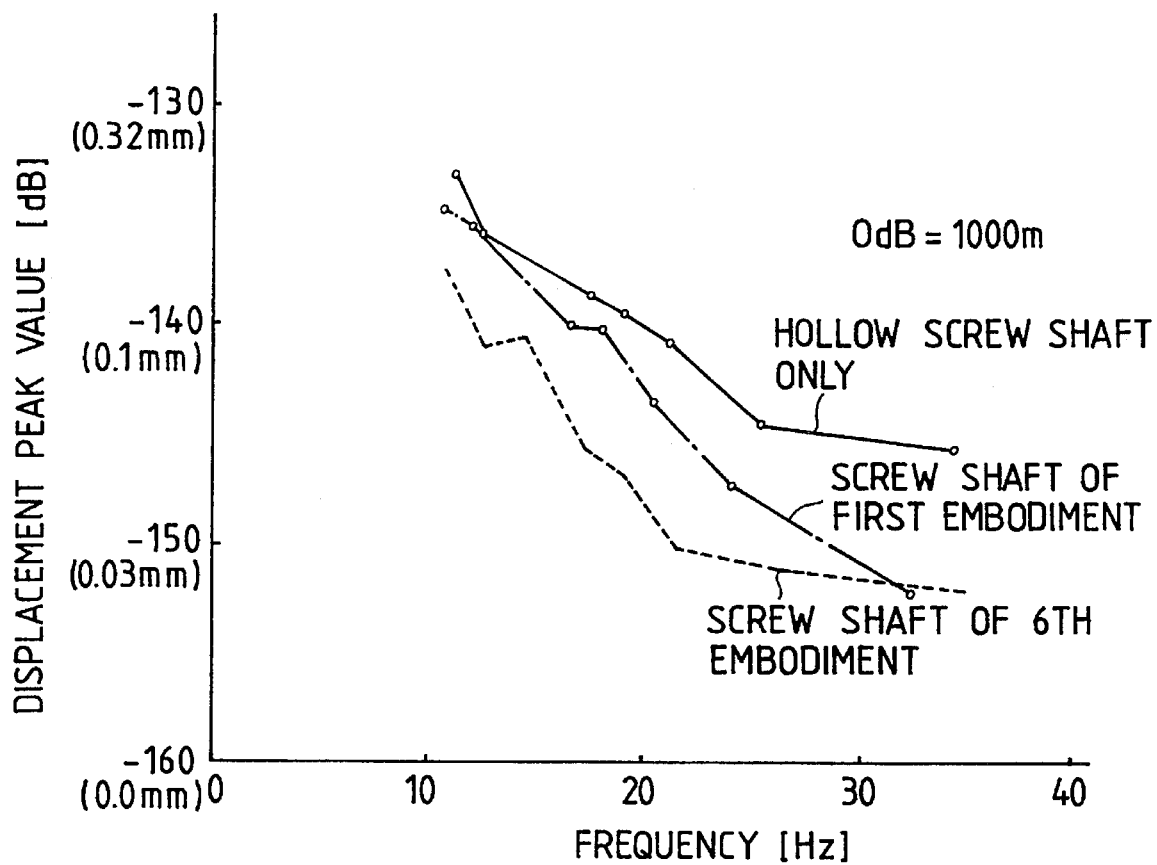
FIG. 15 is a graphical representation of the vibration displacement values respectively obtained by the screw shafts according to the invention and other screw shaft when impact is given to them to cause the same to vibrate.

In FIG. 15, there are shown results obtained when the displacements of the screw shafts due to the impact vibration are plotted for comparison. The results show clearly that, in the case of the screw shaft according to the first embodiment, a vibration damping effect can be confirmed when the natural frequency of the screw shaft becomes a considerably high frequency, whereas, in the case of the screw shaft according to sixth embodiment of the present invention, an outstanding vibration damping effect can be clearly confirmed over a wide area of natural frequencies ranging from the low natural frequency to the high natural frequency of the screw shaft.

Figure 16:
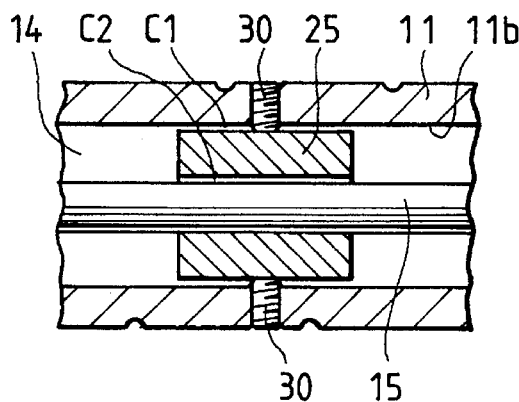
FIG. 16 is an enlarged section view of a modification of a structure for holding a vibration controlling mass member.
Figure 17:
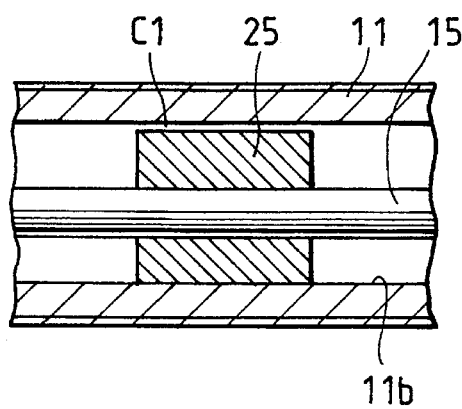
FIG. 17 is an enlarged section view of another modification of a structure for holding a vibration controlling mass member.

FIGS. 16 and 17 respectively show the modifications of the structure for mounting the bushing 25.

In the structure shown in FIG. 16, the bushing 25 is fixed to the hollow screw shaft 11 by a set screw 30 from the outside of the hollow screw shaft 11, in order to prevent the bushing 25 from moving freely in the axial direction within the hollow hole 11b when the ball screw device is in operation. In the state in which the bushing 25 is fixed, there exist a clearance C1 between the outside surface of the bushing 25 and the inside surface of the hollow hole 11b, and a clearance C2 between the inside surface of the bushing 25 and the outside surface of the inner shaft 15. The clearance C2 permits the inner shaft 15 to vibrate independently of the screw shaft 11, so that a great relative movement can be produced between the inner shaft 15 and screw shaft 11.

The present modified structure has an advantage that the support span of the inner shaft 15 can be maintained constant.

In the structure shown in FIG. 17, the bushing 25 is fixed to the inner shaft 15 through shrink fitting in order to prevent the bushing 25 from moving freely in the axial direction of the screw shaft 11 within the hollow hole 11b when the ball screw device is in operation. In this case, the clearance C1 existing between the outside surface of the bushing 25 and the inside surface of the hollow hole 11b permits the inner shaft 15 to vibrate independently of the screw shaft 11, so that a great relative movement can be produced between the inner shaft 15 and screw shaft 11.

The last-mentioned modification, similarly to the previously-mentioned modification, has an advantage that the support span of the inner shaft 15 can be maintained constant.

Figure 18:
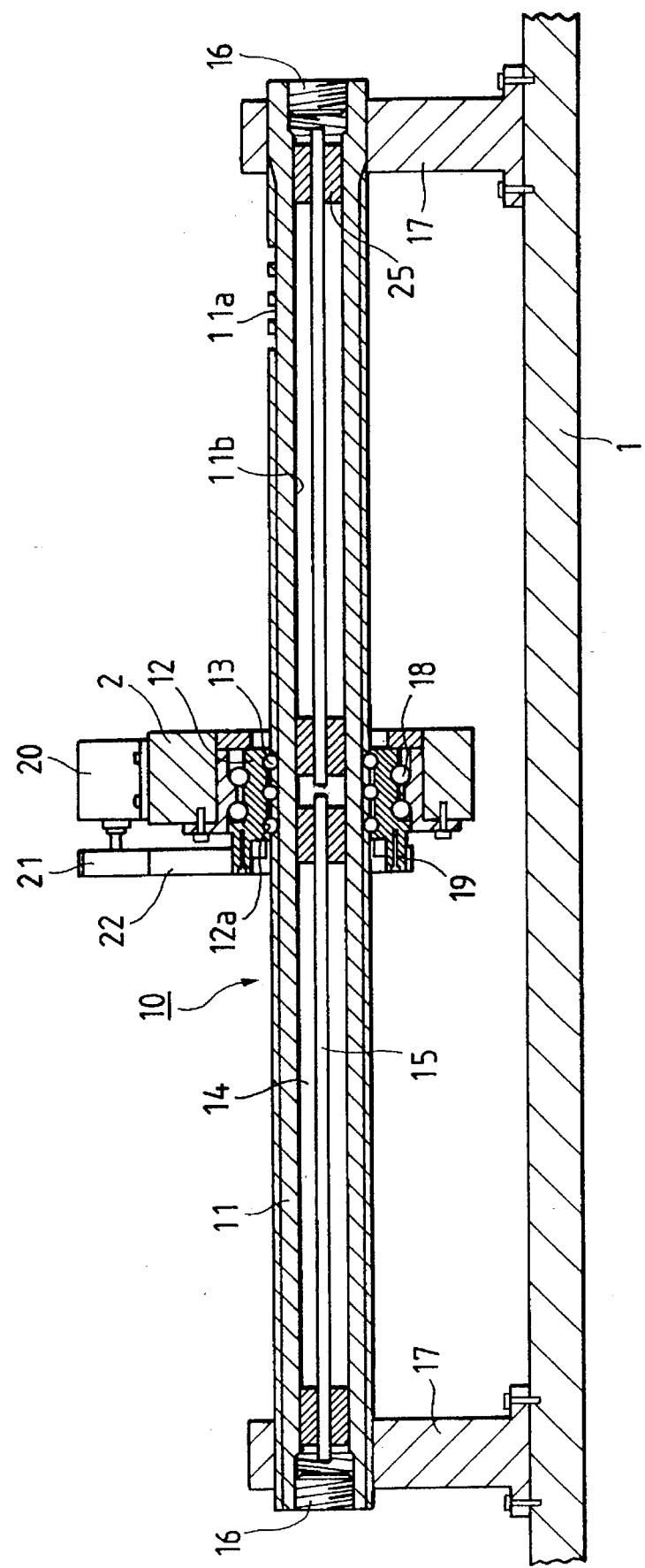
FIG. 18 is a longitudinal section view of a seventh embodiment of a screw shaft according to the invention.

FIG. 18 shows a ball screw device according to a seventh embodiment of the present invention.

This embodiment is different from the sixth embodiment shown in FIG. 10 in that the long inner shaft 15 is divided into a plurality of sections (in the illustrated case, two sections, however, three or more sections are possible). This structure is advantageous in that the inner shafts 15 can be inserted into the hollow hole 11b of the screw shaft 11 more easily.

Figure 19:
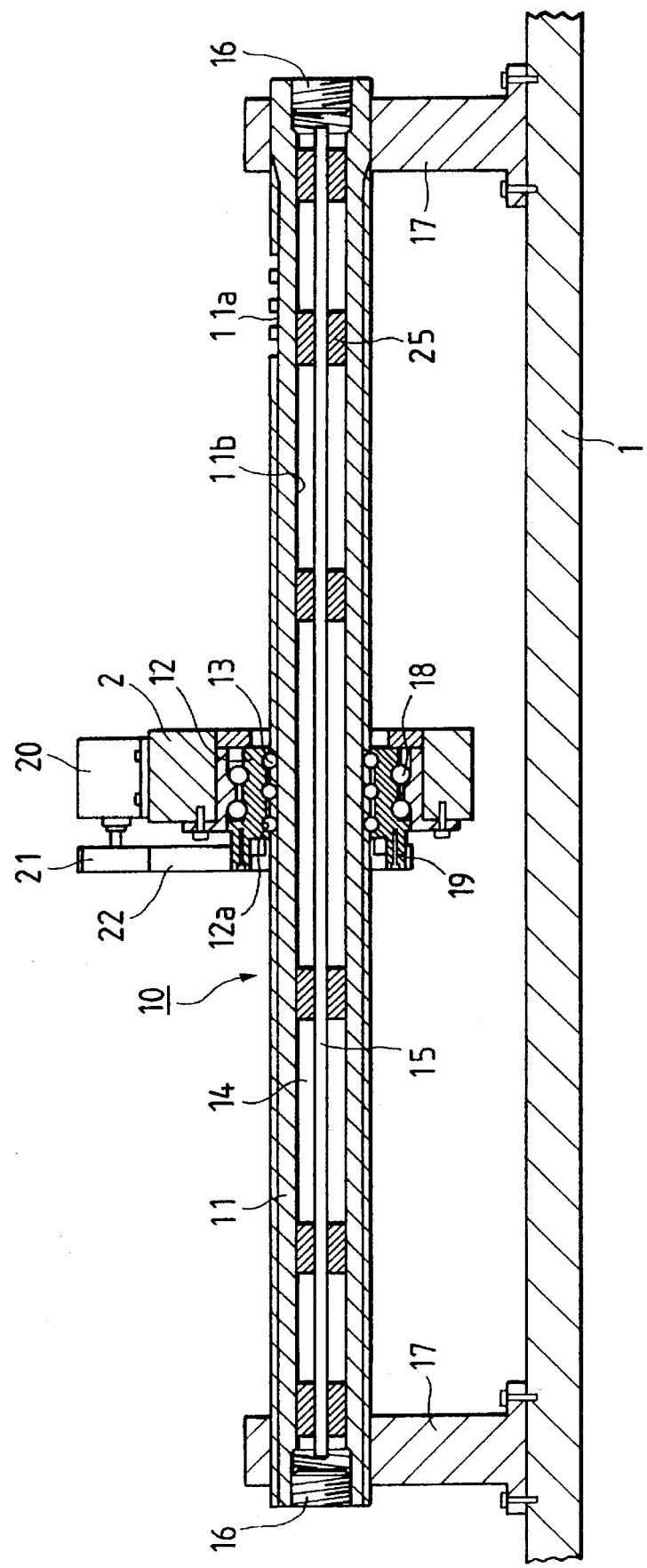
FIG. 19 is a longitudinal section view of an eighth embodiment of a screw shaft according to the invention.

FIG. 19 shows a ball screw device according to an eighth embodiment of the present invention.

In this embodiment, a large number of bushings 25 are used and the inner shaft 15 is supported with a plurality of support spans having different lengths. Since the natural frequency of the inner shaft 15 in the radial direction thereof varies according to the lengths of the support spans, in this case, the inner shaft 15 has a plurality of natural frequencies. As a result of this, even the natural frequency of the screw shaft 11 in the radial direction thereof varies with the movement of the ball nut, it is always near one of the plurality of natural frequencies of the inner shaft 15 in the radial direction thereof, so that the vibration of the screw shaft 11 can be restricted effectively.

Figure 20:
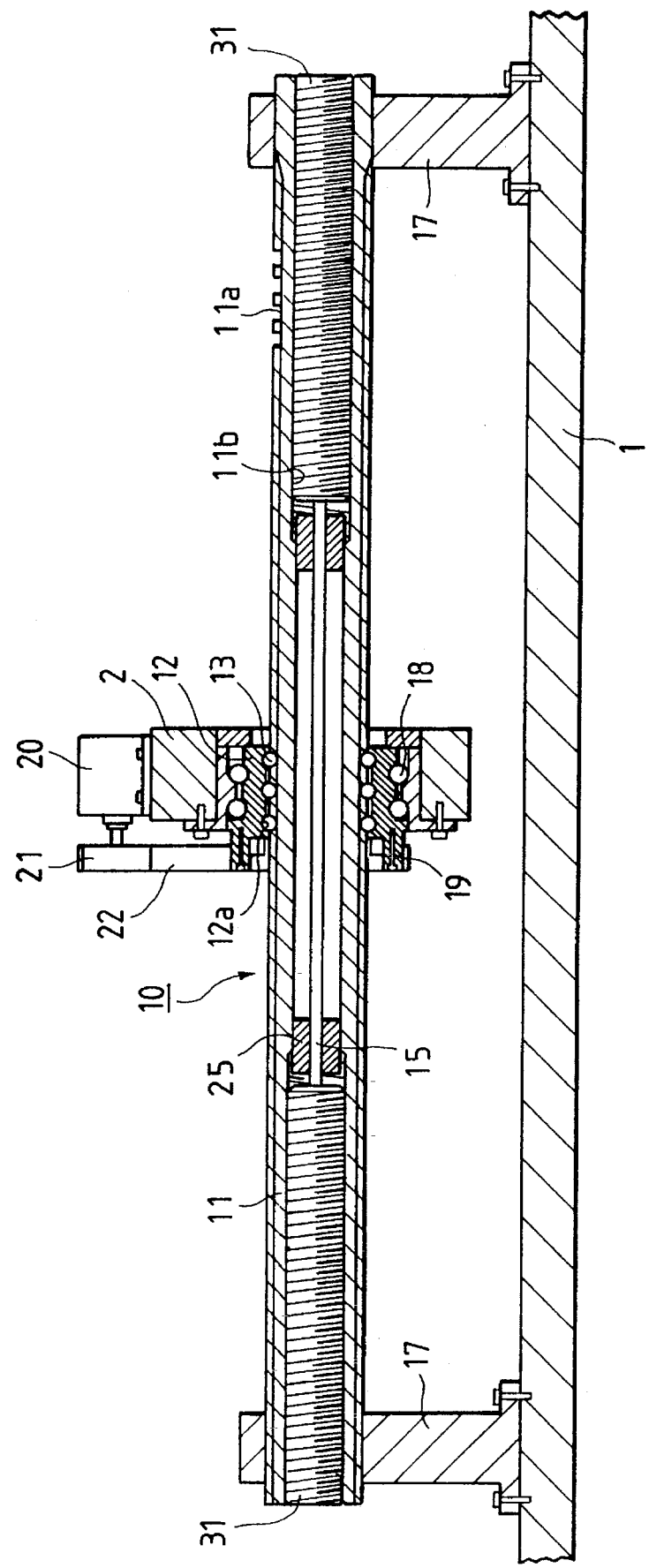
FIG. 20 is a longitudinal section view of a ninth embodiment of a screw shaft according to the invention.

FIG. 20 shows a ball screw device according to a ninth embodiment of the present invention.

In this embodiment, the inner shaft 15 inserted into the hollow hole 11b of the screw shaft 11 is restricted in the axial direction thereof by two long set screws 31 threadedly engaged with the hollow hole 11b from the two sides of the screw shaft 11. When the inner shaft 15 is extremely shorter in length than the screw shaft 11, there is a possibility that, while the ball screw shaft 10 is in operation, the inner shaft 15 supported by the bushing 25 can be moved in one of the axial directions thereof, which can change the characteristic of the damping effect that is initially set. In order to prevent such a, it is desirable that the inner shaft 15 supported by the bushing 25 may be kept in the initial condition thereof. The present embodiment is advantageous in that the position of the inner shaft 15 can be adjusted in the axial direction thereof from the screw shaft ends by use of the set screws 31 and can be easily fixed and kept at the adjusted position.

Figure 21:
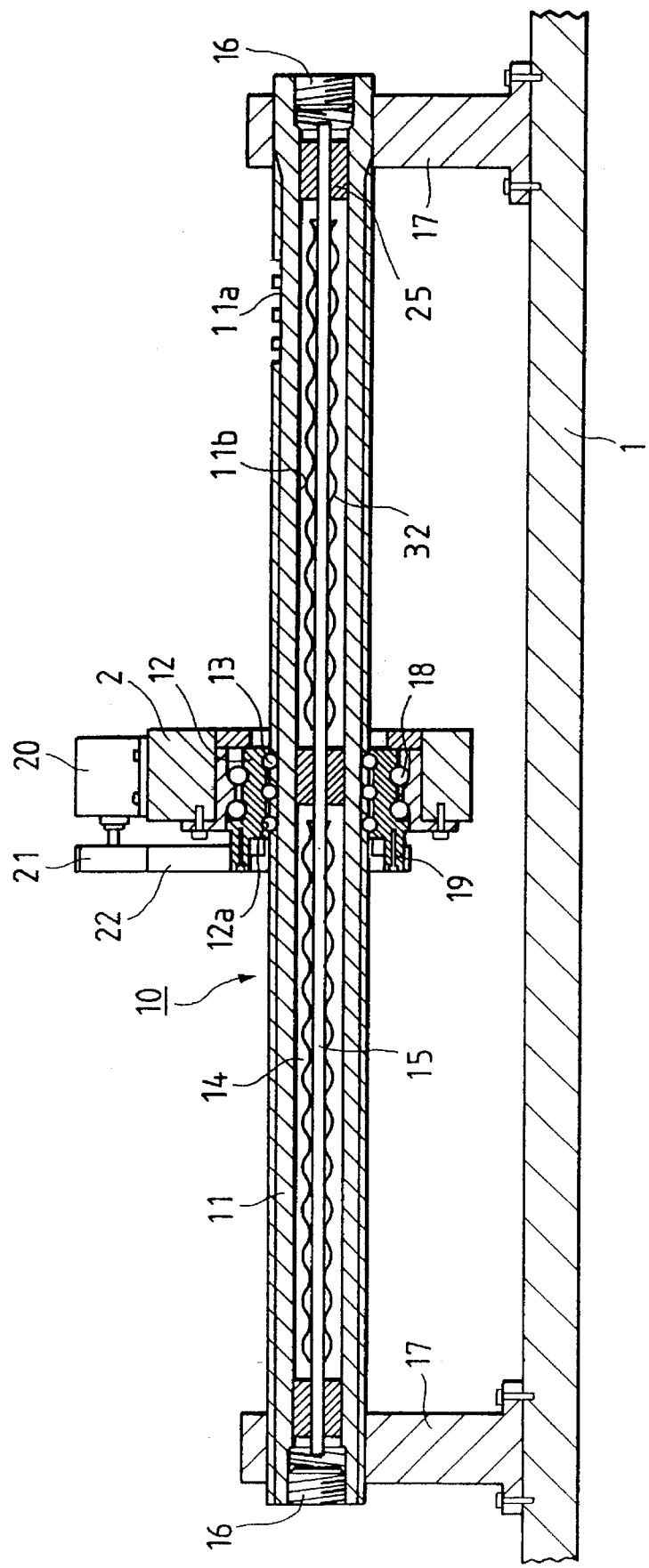
FIG. 21 is a longitudinal section view of a tenth embodiment of a screw shaft according to the invention.

FIG. 21 shows a ball screw device according to a tenth embodiment of the present invention.

This embodiment is different from the embodiment shown in FIG. 10 in that the greater parts of the inner shaft 15 in the longitudinal direction thereof are covered with a resin tube 32 except for the parts thereof supported by the bushings 25. The resin tube 32 not only can relieve the sound that is generated by a collision between the inside surface of the screw shaft 11 and the inner shaft 15 to thereby realize a silent operation, but also can restrict the generation of a new vibratory movement due to the collision.

Figure 22:
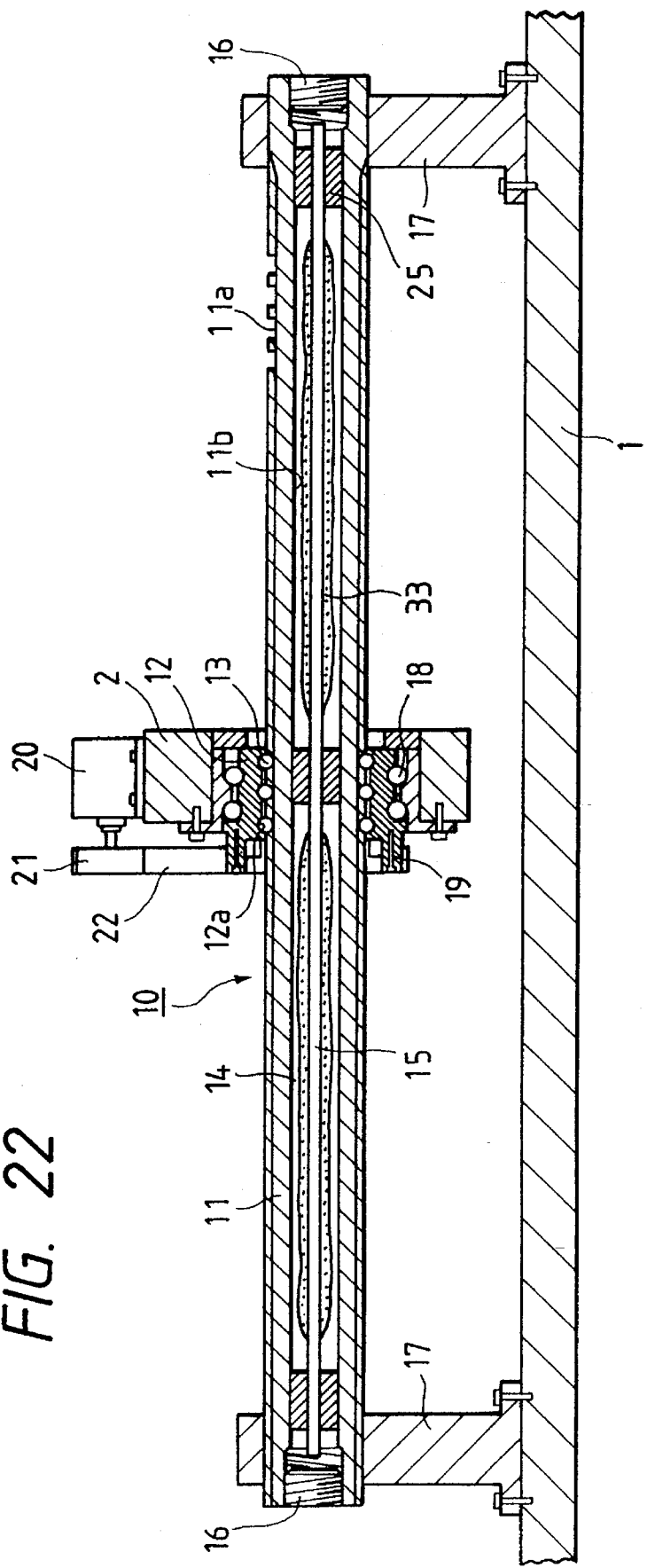
FIG. 22 is a longitudinal section view of an eleventh embodiment of a screw shaft according to the invention.

FIG. 22 shows a ball screw device according to an eleventh embodiment of the present invention.

In this embodiment, the outside surface of the inner shaft 15 is covered with a resin coating 33 instead of the resin tube 32 shown in FIG. 21. The resin coating 33 not only can relieve the sound that is generated by a collision between the inside surface of the screw shaft 11 and the inner shaft 15 to thereby realize a silent operation, but also can restrict the generation of a new vibratory movement due to the collision.

Figure 23:
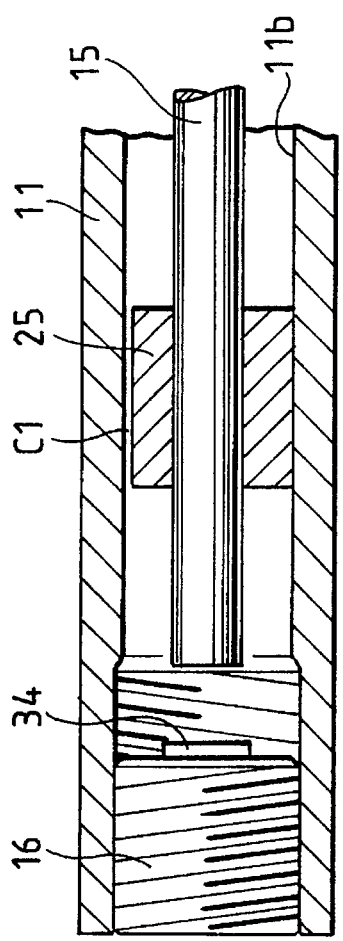
FIG. 23 is a partially enlarged section view of a twelfth embodiment of a screw shaft according to the invention.

FIG. 23 shows a ball screw device according to a twelfth embodiment of the present invention.

In this embodiment, two buffer members 34 formed of rubber material are respectively mounted on the inner end faces of the cover members 16 to be threadedly engaged with the end portions of the hollow hole 11b of the screw shaft 11 with the inner shaft 15 inserted therein. The buffer members 34 not only can relieve the sound that is generated by a collision between the inner shaft 15 and the cover members 16 to thereby realize a silent operation, but also can restrict the generation of a new vibration due to the collision.

In the above-mentioned respective embodiments, the ball nut 12 is driven according to a belt drive system, that is, it is driven by the drive motor 20 disposed on the upper surface of the table 2. However, the invention is not limited to this but other systems are also possible. For example, a hollow motor inserted into the screw shaft 11 may be mounted on the table 2 by means of brackets and the ball nut 12 may be connected to the output portion of the motor so that it can be driven by the motor.

As has been described heretofore, in the ball screw device according to the first aspect of the present invention, there is formed a hollow hole in the screw shaft in such a manner that it extends through the screw shaft, and the long vibration controlling mass member and a rubber member or a synthetic resin member, which is inserted between the outer surface of the vibration controlling mass member and the inner surface of the hollow hole to prevent contact between the vibration controlling mass member and hollow hole, are included in the hollow hole. In the prior art, when the screw shaft is fixed unrotatably and the ball nut is rotated, the slight vibration of the ball nut is transmitted to the screw shaft so that the screw shaft may resonate to a great extent. However, even in such case, due to the above structure, according to the invention, the vibration controlling mass member differing in the natural frequency from the screw shaft moves separately from the screw shaft to thereby dampen the vibration of the screw shaft. Also, the rubber member or synthetic resin member absorbs the vibratory energy by means of its own internal friction and its contact friction with the vibration controlling mass member and screw shaft to thereby dampen the vibration of the screw shaft rapidly. As a result, the resonance vibration of the screw shaft can be controlled effectively.

Also, according to the table drive device of the invention, there is included the above-mentioned ball screw device capable of a high vibration controlling operation, the screw shaft is fixed and a ball nut is rotatably supported on a table, and the ball nut can be rotationally driven by drive means mounted on the table, thereby being able to move the table. Due to this structure, even if the table is moved at a high speed exceeding the critical speed at a long stroke by use of the long screw shaft, there can be eliminated the possibility that the screw shaft can be vibrated greatly due to its resonance vibration to thereby damage the ball screw device. Also, since the ball nut can be rotated at a high speed, when the feeding speed of the table is increased up to a high speed, there is no need to increase the screw lead of the ball screw device especially and a relatively small motor will do, thereby preventing the lowering of the stop position accuracy caused by the inertial increase of the table as well. As a result, according to the present invention, it is effectively possible to provide a table drive device which can be operated at a long stroke and at a high speed and provides a high position accuracy.

Further, according to the second aspect of the present invention, a hollow hole which extends through the screw shaft, the long vibration controlling mass member is inserted into the hollow hole, a vibration controlling mass member support ring providing two or more support points spaced from each other in the axial direction of the mass member is interposed between the outer surface of the vibration controlling mass member and the inner surface of the hollow hole of the screw shaft, and a slight clearance is provided at least between the outside surface of the hold ring and the inside surface of the hollow hole. Due to this structure, the support spans of the vibration controlling mass member can be adjusted to thereby allow the natural frequency of the vibration controlling mass member in the radial direction thereof to approach the natural frequency of the screw shaft, with the result that a great relative movement can be generated between the screw shaft and vibration controlling mass member to produce shock and frictional forces. The thus produced shock and frictional forces can restrict the vibration of the screw shaft effectively and thus, even if the exciting force from the screw shaft is small, a great vibration controlling effect can be obtained.

Further, since the intervals of the two or more support points to be provided by the vibration controlling mass member hold ring in the axial direction thereof are made to differ from each other, the vibration controlling mass member is allowed to have a plurality of natural frequencies. As a result of this, even if the natural frequency of the screw shaft in the radial direction thereof always varies as the ball nut is moved, the natural frequency of the screw shaft is near one of the two or more natural frequencies of the vibration controlling mass member in the radial direction thereof. That is, the present ball screw device can deal with a wide range of frequency areas to thereby control the vibration of the screw shaft further effectively.

What is claimed is:

1. A ball screw device, comprising:
    a screw shaft including a ball screw groove on an outer peripheral surface thereof and including a hollow hole;
    a ball nut having a ball screw groove formed on an inner peripheral surface thereof and disposed opposed to said ball screw groove of said screw shaft;
    a plurality of balls fitted between said ball screw groove of said screw shaft and said ball screw groove of said ball nut for enabling said screw shaft and said ball nut to move spirally with respect to each other;
    a vibration controlling mass member inserted into said hollow hole of said screw shaft; and
    a damping member interposed between an outer surface of said vibration controlling mass member and an inner surface of said hollow hole of said screw shaft for preventing contact between said vibration controlling mass member and said hollow hole.

2. A ball screw device as claimed in claim 1, wherein said damping member is one selected from a group consisting of a rubber member and a synthetic resin member.

3. A ball screw device as claimed in claim 2, wherein said vibration controlling mass member is coated with said rubber member.

4. A ball screw device as claimed in claim 2, wherein said vibration controlling mass member is coated with said synthetic resin member.

5. A ball screw device as claimed in claim 2, wherein said inner surface of said hollow hole of said screw shaft is coated with said rubber member.

6. A ball screw device as claimed in claim 2, wherein said inner surface of said hollow hole of said screw shaft is coated with said synthetic resin member.

7. A ball screw device as claimed in claim 2, wherein said outer surface of said vibration controlling mass member and said inner surface of said hollow hole of said screw shaft are coated with said rubber member.

8. A ball screw device as claimed in claim 2, wherein said outer surface of said vibration controlling mass member and said inner surface of said hollow hole of said screw shaft are coated with said synthetic resin member.

9. A ball screw device as claimed in claim 1, wherein said vibration controlling mass member is divided into a plurality of sections, and said damping member includes a plurality of rubber tubes each covering each of said sections.

10. A ball screw device as claimed in claim 1, wherein said damping member is a rubber tube.

11. A ball screw device as claimed in claim 1, wherein said damping member is a resin tube.

12. A ball screw device as claimed in claim 1, wherein said vibration controlling mass member is divided into a plurality of sections, and said damping member includes a plurality of resin tubes each covering each of said sections.

13. A ball screw device as claimed in claim 1, wherein said damping member is a spirally shaped rubber tape.

14. A ball screw device as claimed in claim 1, wherein said damping member is a rubber molded in said hollow hole of said screw shaft.

15. A ball screw device as claimed in claim 1, wherein said damping member is a resin molded in said hollow hole of said screw shaft.

16. A ball screw device as claimed in claim 1, wherein said damping member is a spirally shaped resin tape.

17. A ball screw device, comprising:
a screw shaft including a ball screw groove on an outer peripheral surface thereof and including a hollow hole formed therein;
a ball nut having a ball screw groove formed on an inner peripheral surface thereof and disposed opposed to said ball screw groove of said screw shaft;
a plurality of balls fitted between said ball screw groove of said screw shaft and said ball screw groove of said ball nut for enabling said screw shaft and said ball nut to move spirally with respect to each other;
a vibration controlling mass member inserted into said hollow hole of said screw shaft with a clearance in a diametric direction thereof; and
vibration controlling mass member hold rings respectively interposed between an outer surface of said vibration controlling mass member and an inner surface of said hollow hole of said screw shaft and providing two or more support points spaced from each other in an axial direction of said vibration controlling mass member, slight clearances being provided at least between outer surfaces of said hold rings and said inner surface of said hollow hole.

18. A ball screw device as claimed in claim 17, wherein axial intervals of said two or more support points provided by said vibration controlling mass member hold rings are made to differ from one another so that said vibration controlling mass member has a plurality of natural frequencies.

19. A ball screw device as claimed in claim 17, further comprising slight clearances being provided between inner surfaces of said hold rings and said outer surface of said vibration controlling mass member.

20. A ball screw device as claimed in claim 17, wherein said respective hold rings are fixed to said screw shaft by a set screw.

21. A ball screw device as claimed in claim 17, wherein said respective hold rings are fixed to said vibration controlling mass member through shrink fitting.

22. A ball screw device as claimed in claim 17, wherein said vibration controlling mass member is devided into a plurality of sections.

23. A ball screw device as claimed in claim 17, wherein said vibration controlling mass member is restricted in an axial direction of said screw shaft by two set screws threadedly engaged with said hollow hole.

24. A ball screw device as claimed in claim 17, wherein said vibration controlling mass member is covered with a resin tube.

25. A ball screw device as claimed in claim 17, wherein said vibration controlling mass member is covered with a rubber tube.

26. A ball screw device as claimed in claim 17, wherein said vibration controlling mass member is coated with a resin.

27. A ball screw device as claimed in claim 17, wherein said vibration controlling mass member is coated with a rubber.

28. A ball screw device as claimed in claim 17, further comprising a cover member threadedly engaged with an end portion of said hollow hole, and a buffer member mounted on an inner end face of said cover member.

29. A table drive device, comprising:
a base member;
a screw shaft having two end portions fixed to said base member, including a ball screw groove on an outer peripheral surface thereof, and including a hollow hole;
a table supported on said base member in such a manner that said table is freely moved in parallel to an axial direction of said screw shaft;
a ball nut having a ball screw groove formed on an inner peripheral surface thereof and disposed opposed to said ball screw groove of said screw shaft;
a plurality of balls fitted between said ball screw groove of said screw shaft and said ball screw groove of said ball nut for enabling said screw shaft and said ball nut to move spirally with respect to each other;
drive means mounted on said table for rotating said ball nut;
a vibration controlling mass member inserted into said hollow hole of said screw shaft; and
a damping member interposed between an outer surface of said vibration controlling mass member and an inner surface of said hollow hole of said screw shaft for preventing contact between said vibration controlling mass member and said hollow hole.

30. A table drive device as claimed in claim 29, wherein said damping member is one selected from a group consisting of a rubber member and a synthetic resin member.

31. A table drive device as claimed in claim 29, further comprising vibration controlling mass member hold rings respectively interposed between said outer surface of said vibration controlling mass member and said inner surface of said hollow hole of said screw shaft and providing two or more support points spaced from each other in an axial direction of said vibration controlling mass member, wherein there are provided slight clearances at least between outside surfaces of said hold rings and said inner surface of said hollow hole.

* * * * *